(12) United States Patent
Ohishi et al.

(10) Patent No.: US 11,174,431 B2
(45) Date of Patent: Nov. 16, 2021

(54) LIQUID CRYSTAL COMPOSITION AND LIQUID CRYSTAL DISPLAY DEVICE

(71) Applicant: DIC Corporation, Tokyo (JP)

(72) Inventors: Haruki Ohishi, Kita-adachi-gun (JP); Tsuyoshi Sasaki, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 104 days.

(21) Appl. No.: 16/490,177

(22) PCT Filed: Feb. 15, 2018

(86) PCT No.: PCT/JP2018/005213
§ 371 (c)(1),
(2) Date: Aug. 30, 2019

(87) PCT Pub. No.: WO2018/159303
PCT Pub. Date: Sep. 7, 2018

(65) Prior Publication Data
US 2020/0002611 A1     Jan. 2, 2020

(30) Foreign Application Priority Data

Mar. 1, 2017  (JP) .............................. JP2017-038266

(51) Int. Cl.
| | | |
|---|---|---|
| *G02F 1/1333* | (2006.01) | |
| *C09K 19/30* | (2006.01) | |
| *C09K 19/54* | (2006.01) | |
| *C09K 19/60* | (2006.01) | |
| *G02F 1/1335* | (2006.01) | |
| *G02F 1/1337* | (2006.01) | |
| *G02F 1/1347* | (2006.01) | |
| *C09K 19/04* | (2006.01) | |

(52) U.S. Cl.
CPC ...... *C09K 19/3068* (2013.01); *C09K 19/3066* (2013.01); *C09K 19/542* (2013.01); *C09K 19/601* (2013.01); *G02F 1/1337* (2013.01); *G02F 1/1347* (2013.01); *G02F 1/133502* (2013.01); *G02F 1/133512* (2013.01); *C09K 2019/0451* (2013.01); *C09K 2019/3075* (2013.01); *C09K 2019/3077* (2013.01); *C09K 2019/3078* (2013.01); *C09K 2019/548* (2013.01)

(58) Field of Classification Search
CPC ............ C09K 19/3068; C09K 19/3066; C09K 19/542; C09K 19/601; C09K 2019/0451; C09K 2019/3075; C09K 2019/3077; C09K 2019/3078; C09K 2019/548; G02F 1/1333; G02F 1/133502; G02F 1/133512; G02F 1/1337; G02F 1/1347

USPC ........................................................ 252/299.01
See application file for complete search history.

(56) References Cited

U.S. PATENT DOCUMENTS

| | | |
|---|---|---|
| 6,033,598 A | 3/2000 | Kaneko et al. |
| 9,057,020 B2 | 6/2015 | Bacher et al. |
| 2001/0045545 A1 | 11/2001 | Tarumi et al. |
| 2009/0033861 A1 | 2/2009 | Shiga et al. |
| 2014/0333985 A1 | 11/2014 | Junge et al. |
| 2016/0033807 A1 | 2/2016 | Junge et al. |
| 2016/0108318 A1 | 4/2016 | Archetti et al. |
| 2020/0002611 A1* | 1/2020 | Ohishi ............... C09K 19/2014 |

FOREIGN PATENT DOCUMENTS

| | | | |
|---|---|---|---|
| CN | 106873197 A | 6/2017 | |
| JP | 2000-96059 A | 4/2000 | |
| JP | 2000-313881 A | 11/2000 | |
| JP | 2001-42793 A | 2/2001 | |
| JP | 2001-72977 A | 3/2001 | |
| JP | 2008-179670 A | 8/2008 | |
| JP | 2012-31384 A | 2/2012 | |
| JP | 2013-139521 A | 7/2013 | |
| JP | 2013-534945 A | 9/2013 | |
| JP | 2015-509206 A | 3/2015 | |
| JP | 57229092 * | 6/2015 | ............. C09K 19/42 |
| JP | 2015-165020 A | 9/2015 | |
| JP | 2016-510907 A | 4/2016 | |
| JP | 2016-523997 A | 8/2016 | |
| JP | 2016-199704 A | 12/2016 | |
| JP | 6070973 B1 | 2/2017 | |
| WO | 97/17415 A1 | 5/1997 | |
| WO | 2017/038616 A1 | 3/2017 | |

OTHER PUBLICATIONS

International Search Report dated Apr. 10, 2018, issued in counterpart International Application No. PCT/JP2018/005213(4 pages).

* cited by examiner

*Primary Examiner* — Geraldina Visconti
(74) *Attorney, Agent, or Firm* — Westerman, Hattori, Daniels & Adrian, LLP

(57) ABSTRACT

There are provided a liquid crystal composition containing one or two or more compounds represented by general formula (L) and three or four or more dichroic dyes selected from azo compounds, and a guest-host liquid crystal display device or light-controlling device that uses the liquid crystal composition. The liquid crystal composition according to the present invention contains dichroic dyes that satisfy high contrast, high solubility, high nematic-isotropic transition temperature ($T_{NI}$), and low birefringent anisotropy ($\Delta n$) effective for high light resistance and high thermal resistance at the same time. The use of the liquid crystal composition according to the present invention provides a liquid crystal display device or a light-controlling device that exhibits a good-looking black color and has high contrast, high display quality, and high practicality.

21 Claims, No Drawings

LIQUID CRYSTAL COMPOSITION AND LIQUID CRYSTAL DISPLAY DEVICE

TECHNICAL FIELD

The present invention relates to a liquid crystal composition containing an azo dichroic dye and a liquid crystal display device or a light-controlling device using the liquid crystal composition.

BACKGROUND ART

Liquid crystal materials are used for various display devices, such as TVs and smartphones, that display texts, images, and videos and are also being put to practical use for light-controlling devices that control the transmission of light.

In particular, when a "guest-host (GH) liquid crystal composition" obtained by adding a dichroic dye to a host liquid crystal composition is used, polarizing plates are not required. Thus, a light-controlling device produced at low cost and having a high transmittance is promising.

Such a GH liquid crystal composition has been studied for a long time. The development of liquid crystal display devices and light-controlling devices having useful device performance (e.g., large dichroic ratio, high contrast, high solubility with a liquid crystal composition, high light resistance, high UV resistance, and high thermal resistance) has been attempted (refer to PTL 1).

However, some of components in the liquid crystal composition containing a dichroic dye are not suitable for use in liquid crystal display devices and light-controlling devices, which requires a further improvement in performance. For example, to achieve a large dichroic ratio, a large amount of dichroic dye needs to be added to the liquid crystal composition, which poses a problem in terms of solubility of a composition, such as precipitation of a dichroic dye and a liquid crystal compound. In particular, when the liquid crystal composition is used for light-controlling devices, a nematic liquid crystal phase needs to be exhibited in a wide temperature range. However, the dye has a higher molecular weight than a liquid crystal compound, which poses a problem in terms of solubility at low temperature.

A highly reliable liquid crystal composition for TVs having a negative dielectric anisotropy can be used as a host liquid crystal composition for light-controlling devices. To achieve practical use as a liquid crystal composition for light-controlling devices, the development of a GH liquid crystal composition that has high dissolution stability at low temperature, high nematic-isotropic transition temperature ($T_{NI}$), and low birefringent anisotropy ($\Delta n$) effective for high light resistance and high thermal resistance at the same time is demanded.

CITATION LIST

Patent Literature

PTL 1: Japanese Unexamined Patent Application Publication (Translation of PCT Application) No. 2013-534945
PTL 2: International Publication No. 1997/17415

SUMMARY OF INVENTION

Technical Problem

It is an object of the present invention to provide a liquid crystal composition containing dichroic dyes that satisfy high contrast, high solubility, high nematic-isotropic transition temperature ($T_{NI}$), and low birefringent anisotropy ($\Delta n$) effective for high light resistance and high thermal resistance at the same time and to provide a liquid crystal display device or a light-controlling device that uses the liquid crystal composition.

Solution to Problem

As a result of thorough studies conducted by the present inventors, they have found that the above object can be achieved by providing the following liquid crystal composition and have completed the present invention. The liquid crystal composition contains one or two or more compounds represented by general formula (L) and three or four or more dichroic dyes selected from azo compounds,

[Chem. 1]

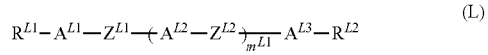
(L)

(In the formula, $R^{L1}$ and $R^{L2}$ each independently represent an alkyl group having 1 to 12 carbon atoms, where one —$CH_2$— or two or more non-adjacent —$CH_2$— in the alkyl group may be each independently substituted with —CH=CH—, —O—, —CO—, —COO—, or —OCO—,
$m^{L1}$ represents 0, 1, 2, or 3,
$A^{L1}$, $A^{L2}$, and $A^{L3}$ each independently represent a group selected from the group consisting of
(a) a 1,4-cyclohexylene group (one —$CH_2$— or two or more non-adjacent —$CH_2$— in this group may be substituted with —O—),
(b) a 1,4-phenylene group (one —CH= or two or more non-adjacent —CH= in this group may be substituted with —N=), and
(c) 1,4-cyclohexenylene, 1,4-bicyclo(2.2.2)octylene, piperidine-1,4-diyl, naphthalene-2,6-diyl, decahydronaphthalene-2,6-diyl, and 1,2,3,4-tetrahydronaphthalene-2,6-diyl, where the group (a), the group (b), and the groups (c) may be each independently substituted with an alkyl group having 1 to 3 carbon atoms, an alkenyl group having 2 or 3 carbon atoms, alkoxyl having 1 to 3 carbon atoms, an alkenyloxy group having 1 to 3 carbon atoms, a cyano group, or a fluorine atom, and $A^{L1}$, $A^{L2}$, and $A^{L3}$ do not represent a 2,3-difluoro-1,4-phenylene group, a 1,7,8-trifluoronaphthalene-2,6-diyl group, or a 3,4,5-trifluoronaphthalene-2,6-diyl group,
$Z^1$ and $Z^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, or —CF=CF, and
when $m^{L1}$ represents 2 or 3 and a plurality of $A^{L2}$ and a plurality of $Z^{L2}$ are present, $A^{L2}$ may be the same or may be independently different from each other and $Z^{L2}$ may be the same or may be independently different from each other.)

That is, the present invention provides a liquid crystal composition containing one or two or more compounds represented by general formula (L) and three or four or more dichroic dyes selected from azo compounds, and a liquid crystal display device or a light-controlling device that uses the liquid crystal composition.

Advantageous Effects of Invention

According to the present invention, there can be provided a liquid crystal composition containing dichroic dyes that satisfy high contrast, high solubility, high nematic-isotropic transition temperature ($T_{NI}$), and low birefringent anisotropy ($\Delta n$) effective for high light resistance and high thermal resistance at the same time. The use of the liquid crystal composition can provide a liquid crystal display device or a light-controlling device that exhibits a good-looking black color and has high contrast, high display quality, and high practicality.

DESCRIPTION OF EMBODIMENTS

A liquid crystal composition according to the present invention contains three or four or more dichroic dyes selected from azo compounds. For the azo compounds, three or four or more dichroic dyes selected from disazo compounds and trisazo compounds are preferably contained. The liquid crystal composition may contain, as dichroic dyes selected from disazo compounds and trisazo compounds, three or four or more disazo compounds alone, three or four or more trisazo compounds alone, or both disazo compounds and trisazo compounds.

The disazo compounds or the trisazo compounds are, for example, preferably compounds selected from compounds represented by general formula (A) below.

[Chem. 2]

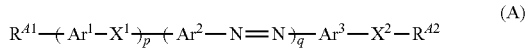

(A)

(In the formula, $R^{A1}$ and $R^{A2}$ each independently represent a hydrogen atom, a halogen atom, an alkyl group having 1 to 12 carbon atoms, or a dialkylamino group in which alkyl groups having 1 to 12 carbon atoms are bonded, where one —$CH_2$— or two or more non-adjacent —$CH_2$— in the alkyl group and the dialkylamino group may be each independently substituted with —O—, —CO—, —COO—, or —OCO— and hydrogen atoms in the alkyl group and the dialkylamino group may be substituted with fluorine atoms; $X^1$ and $X^2$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —C≡C—, or —CF=CF; and $Ar^1$ and $Ar^3$ each independently represent a group selected from groups below, where these groups may be each independently substituted with an alkyl group having 1 to 3 carbon atoms, an alkenyl group having 2 or 3 carbon atoms, an alkoxy group having 1 to 3 carbon atoms, an alkenyloxy group having 1 to 3 carbon atoms, a cyano group, or a fluorine atom,

[Chem. 3]

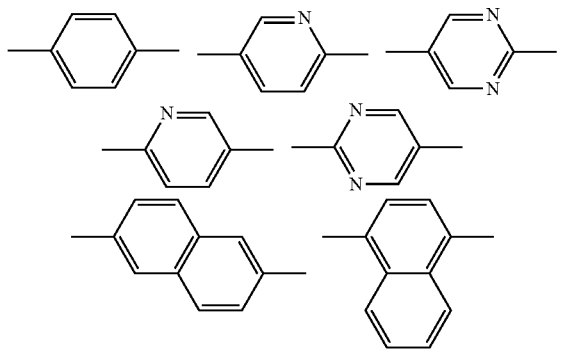

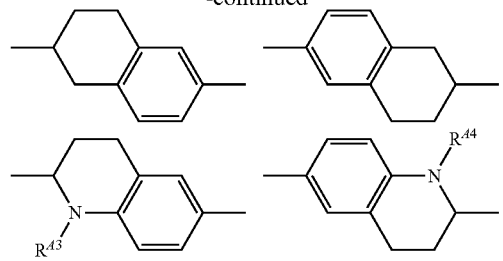

($R^{A3}$ and $R^{A4}$ each independently represent an alkyl group having 1 to 12 carbon atoms);
$Ar^2$ represents a group selected from groups below, where these groups may be each independently substituted with an alkyl group having 1 to 3 carbon atoms, an alkenyl group having 2 or 3 carbon atoms, an alkoxy group having 1 to 3 carbon atoms, an alkenyloxy group having 1 to 3 carbon atoms, a cyano group, or a fluorine atom;

[Chem. 4]

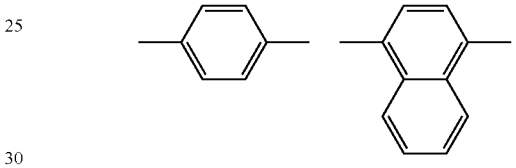

p represents 0, 1, or 2, where when p represents 2 and a plurality of $Ar^1$ and a plurality of $X^1$ are present, the plurality of $Ar^1$ may be the same or may be independently different from each other and the plurality of $X^1$ may be the same or may be independently different from each other; and
q represents 2 or 3, where $Ar^e$ may be the same or may be independently different from each other).

The alkyl group present in the general formula (A) may be a linear alkyl group or a branched alkyl group.

For the azo compounds, at least one dichroic dye selected from dichroic dyes having a maximum absorption wavelength of 390 nm to 440 nm (hereafter referred to as "compounds A"), dichroic dyes having a maximum absorption wavelength of 490 nm to 540 nm (hereafter referred to as "compounds B"), and dichroic dyes having a maximum absorption wavelength of 550 to 650 nm (hereafter referred to as "compounds C") is preferably used. More preferably, at least one of the compounds A, at least one of the compounds B, and at least one of the compounds C are contained. When the compounds A, the compounds B, and the compounds C are contained, the solubility with a liquid crystal composition and the low-temperature stability can be maintained even if the total content of the dichroic dyes is increased.

The ratio of the content of the compound A, the content of the compound B, and the content of the compound C relative to the total amount of the dichroic dyes in the liquid crystal composition is preferably A:B:C=10 to 60 wt %:10 to 60 wt %:10 to 60 wt %. The ratio of the content of the compound A, the content of the compound B, and the content of the compound C is appropriately adjusted in accordance with the target chromaticity. The total amount of the compound A, the compound B, and the compound C added relative to the total amount of the dichroic dyes in the liquid crystal composition is preferably 50 wt % or more, more preferably 60 wt % or more, more preferably 70 wt % or more, more preferably 80 wt % or more, more preferably 90 wt % or more, more preferably 95 wt % or more, and more preferably 100 wt %.

In the liquid crystal composition according to the present invention, the chromaticities x, y in the standard illuminant D65 are each preferably adjusted to 0.310 to 0.370. This is because a liquid crystal composition having a tinge of black is obtained and a device having high contrast is obtained. The chromaticity is expressed based on the CIE 1931 xy coordinates. The chromaticity is preferably measured in a state in which a liquid crystal composition is injected into a cell having a thickness of 10 μm. More preferably, the cell is an antiparallel cell.

The dichroic dye content is preferably 0.5 to 5 parts by weight relative to 100 parts by weight of the liquid crystal composition according to the present invention. More specifically, the dichroic dye content relative to 100 parts by weight of the liquid crystal composition is preferably 1 part by weight or more, more preferably 1.3 parts by weight or more, more preferably 1.5 parts by weight or more, more preferably 2.0 parts by weight or more, and more preferably 2.5 parts by weight or more and preferably 4 parts by weight or less, more preferably 3.5 parts by weight or less, and more preferably 3 parts by weight or less.

The liquid crystal composition according to the present invention may contain dichroic dyes other than disazo compounds and trisazo compounds. Each of the dichroic dyes contained in the liquid crystal composition according to the present invention is preferably an azo dichroic dye. When each of the dichroic dyes is an azo dichroic dye, the dichroic ratio, the solubility of the liquid crystal composition, and the low-temperature stability are further improved.

The liquid crystal composition according to the present invention contains one or two or more compounds represented by general formula (L). The compounds represented by the general formula (L) may be used alone or in combination. The types of compounds that can be combined with each other are not particularly limited. These compounds are appropriately combined with each other in accordance with the desired performance such as the solubility at low temperature, the transition temperature, or the birefringence. The number of the types of compounds used is, for example, one in an embodiment of the present invention. Alternatively, the number of the types of compounds used is two, three, four, five, six, seven, eight, nine, or ten or more in other embodiments of the present invention.

The content of the compounds represented by the general formula (L) in the composition according to the present invention needs to be appropriately adjusted in accordance with the required performance such as the solubility at low temperature, the transition temperature, or the birefringence.

The lower limit of the preferred content of the compounds represented by the formula (L) relative to the total amount of the composition according to the present invention is 1%, 2%, 5%, 8%, 10%, 13%, 15%, 18%, 20%, 22%, 25%, 30%, 40%, 50%, 55%, 60%, 65%, 70%, 75%, or 80%. A high content of the compounds poses a problem such as precipitation. Therefore, the upper limit of the preferred content is 85%, 75%, 65%, 55%, 45%, 35%, 30%, 28%, 25%, 23%, 20%, 18%, 15%, 13%, 10%, 8%, or 5%.

When the composition according to the present invention needs to have a low viscosity and contribute to a high response speed, the lower limit and the upper limit are preferably high. When the composition according to the present invention is a highly reliable composition that contributes to a high specific resistance and a high VHR and the driving voltage is not restricted, the lower limit and the upper limit are preferably high. When the dielectric anisotropy is increased to maintain a low driving voltage, the lower limit and the upper limit are preferably low.

When an importance is given to reliability, $R^{L1}$ and $R^{L2}$ each preferably represent an alkyl group. When an importance is given to reduction in the volatility of the compound, $R^{L1}$ and $R^{L2}$ each preferably represent an alkoxy group. When an importance is given to reduction in viscosity, at least one of $R^{L1}$ and $R^{L2}$ is preferably an alkenyl group.

The number of halogen atoms in the molecule is preferably 0, 1, 2, or 3 and more preferably 0 or 1. When an importance is given to compatibility with other liquid crystal molecules, the number of halogen atoms is preferably 1.

When the ring structures to which $R^{L1}$ and $R^{L2}$ bond are phenyl groups (aromatic groups), $R^{L1}$ and $R^{L2}$ preferably represent a linear alkyl group having 1 to 5 carbon atoms, a linear alkoxy group having 1 to 4 carbon atoms, or an alkenyl group having 4 or 5 carbon atoms. When the ring structures to which $R^{L1}$ and $R^{L2}$ bond are saturated ring structures such as cyclohexane, pyran, and dioxane, $R^{L1}$ and $R^{L2}$ preferably represent a linear alkyl group having 1 to 5 carbon atoms, a linear alkoxy group having 1 to 4 carbon atoms, or a linear alkenyl group having 2 to 5 carbon atoms. To stabilize the nematic phase, the total number of carbon atoms and, if present, oxygen atoms is preferably 5 or less and a linear chain is preferably employed.

The alkenyl group is preferably a group selected from groups represented by formula (R1) to formula (R5) (the black circle in each of the formulae represents a carbon atom in a ring structure).

[Chem. 5]

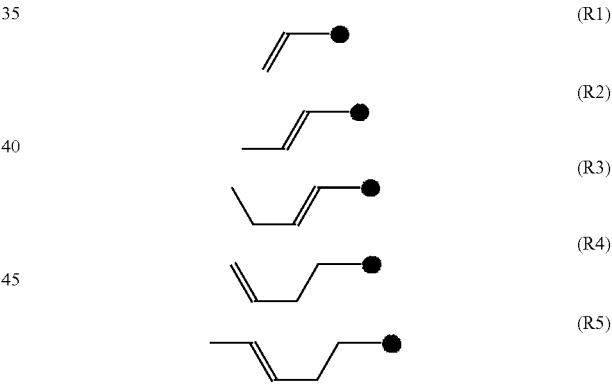

When an importance is given to response speed, $m^{L1}$ preferably represents 0. To improve the upper-limit temperature of the nematic phase, $m^{L1}$ preferably represents 2 or 3. To achieve a good balance therebetween, $m^{L1}$ preferably represents 1. To satisfy the characteristics required as a composition, compounds having different $m^{L1}$ are preferably combined with each other.

When Δn needs to be increased, $A^{L1}$, $A^{L2}$, and $A^{L3}$ preferably represent an aromatic group. To improve the response speed, $A^{L1}$, $A^{L2}$, and $A^{L3}$ preferably represent an aliphatic group. $A^{L1}$, $A^{L2}$, and $A^{L3}$ preferably each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group and more preferably each independently represent the following structures.

[Chem. 6]

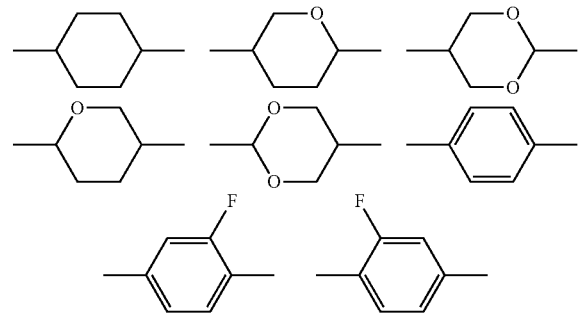

$A^{L1}$, $A^{L2}$, and $A^{L3}$ more preferably each independently represent a trans-1,4-cyclohexylene group or a 1,4-phenylene group.

When an importance is given to response speed, $Z^{L1}$ and $Z^{L2}$ preferably represent a single bond. The number of halogen atoms in a molecule of the compound represented by the general formula (L) is preferably 0 or 1.

More specifically, the liquid crystal composition preferably contains compounds represented by general formulae (C1) to (C3) as the compounds represented by the general formula (L). The compounds represented by the general formulae (C1) to (C3) may be used alone or in combination of two or more.

[Chem. 7]

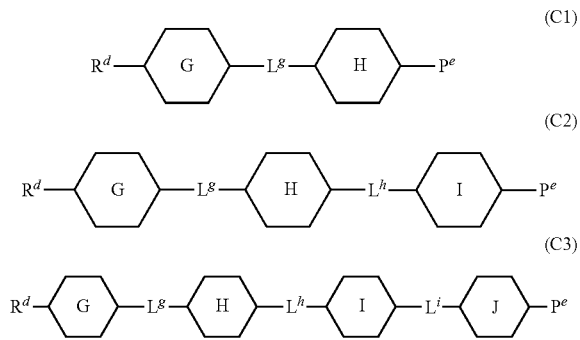

In the above formulae, $R^d$ and $P^e$ each independently represent an alkyl group having 1 to 12 carbon atoms. The alkyl group may be a linear group or may have a methyl or ethyl branch and may have a three- to six-membered ring structure. Any of —CH$_2$— present in the group may be substituted with —O—, —CH=CH—, —CH=CF—, —CF=CH—, —CF=CF—, or —C≡C—, and any hydrogen atom present in the group may be substituted with a fluorine atom or a trifluoromethoxy group. Rd and Re preferably represent a linear alkyl group having 1 to 7 carbon atoms, a linear 1-alkenyl group having 2 to 7 carbon atoms, a linear 3-alkenyl group having 4 to 7 carbon atoms, a linear alkoxyl group having 1 to 3 carbon atoms, or a linear alkyl group having 1 to 5 carbon atoms and terminated with an alkoxyl group having 1 to 3 carbon atoms. Furthermore, at least one of Rd and Re particularly preferably represents a linear alkyl group having 1 to 7 carbon atoms, a linear 1-alkenyl group having 2 to 7 carbon atoms, or a linear 3-alkenyl group having 4 to 7 carbon atoms. When an asymmetric carbon atom is generated due to branching, the compound may be an optically active compound or a racemate.

The ring G, the ring H, the ring I, and the ring J each independently represent a trans-1,4-cyclohexylene group, a trans-decahydronaphthalene-trans-2,6-diyl group, a 1,4-phenylene group that may be substituted with 1 or 2 fluorine atoms or methyl groups, a naphthalene-2,6-diyl group that may be substituted with one or more fluorine atoms, a tetrahydronaphthalene-2,6-diyl group that may be substituted with 1 or 2 fluorine atoms, a 1,4-cyclohexenylene group that may be substituted with 1 or 2 fluorine atoms, a 1,3-dioxane-trans-2,5-diyl group, a pyrimidine-2,5-diyl group, or a pyridine-2,5-diyl group. In each of the compounds, the number of the trans-decahydronaphthalene-trans-2,6-diyl group, the naphthalene-2,6-diyl group that may be substituted with one or more fluorine atoms, the tetrahydronaphthalene-2,6-diyl group that may be substituted with 1 or 2 fluorine atoms, the 1,4-cyclohexenylene group that may be substituted with a fluorine atom, the 1,3-dioxane-trans-2,5-diyl group, the pyrimidine-2,5-diyl group, and the pyridine-2,5-diyl group is preferably within one, and the other rings are preferably a trans-1,4-cyclohexylene group or a 1,4-phenylene group that may be substituted with 1 or 2 fluorine atoms or methyl groups.

$L^g$, $L^h$, and $L^i$ are linking groups and each independently represent a single bond, an ethylene group (—CH$_2$CH$_2$—), a 1,2-propylene group (—CH(CH$_3$)CH$_2$— and —CH$_2$CH(CH$_3$)—), a 1,4-butylene group, —COO—, —OCO—, —OCF$_2$—, —CF$_2$O—, —CH=CH—, —CH=CF—, —CF=CH—, —CF=CF—, —C≡C—, or —CH=NN=CH— and preferably each independently represent a single bond, an ethylene group, a 1,4-butylene group, —COO—, —OCO—, —OCF$_2$—, —CF$_2$O—, —CF=CF—, —C≡C—, or —CH=NN=CH—. In the general formula (C2), at least one of $L^g$ and $L^h$ preferably represents a single bond. In the general formula (C3), at least two of $L^g$, $L^h$, and $L^i$ preferably represent a single bond.

When the compounds represented by the general formulae (C1) to (C3) are used in combination, the same alternatives (e.g., ring G and $L^g$) in different molecules may represent the same substituent or different substituents.

In the general formulae (C1) to (C3), the number of halogen atoms in a molecule is preferably 0 or 1.

The lower limit of the preferred content of the compounds represented by the general formulae (C1) to (C3) relative to the total amount of the composition according to the present invention is 1%, 2%, 5%, 8%, 10%, 13%, 15%, 18%, 20%, 22%, 25%, 30%, 40%, 50%, 55%, 60%, 65%, 70%, 75%, or 80%. The upper limit of the preferred content is 85%, 75%, 65%, 55%, 45%, 35%, 30%, 28%, 25%, 23%, 20%, 18%, 15%, 13%, 10%, 8%, or 5%.

When the composition according to the present invention needs to have a low viscosity and contribute to a high response speed, the lower limit is preferably decreased and the upper limit is preferably increased. When the composition according to the present invention needs to be a highly reliable composition that contributes to a high specific resistance and a high VHR, the lower limit is preferably increased and the upper limit is preferably increased. When the dielectric anisotropy is increased to maintain a low driving voltage, the lower limit is preferably decreased and the upper limit is preferably decreased.

The compounds represented by the general formula (C1) can be more preferably represented by general formulae (C1a) to (C1h) below.

[Chem. 8]

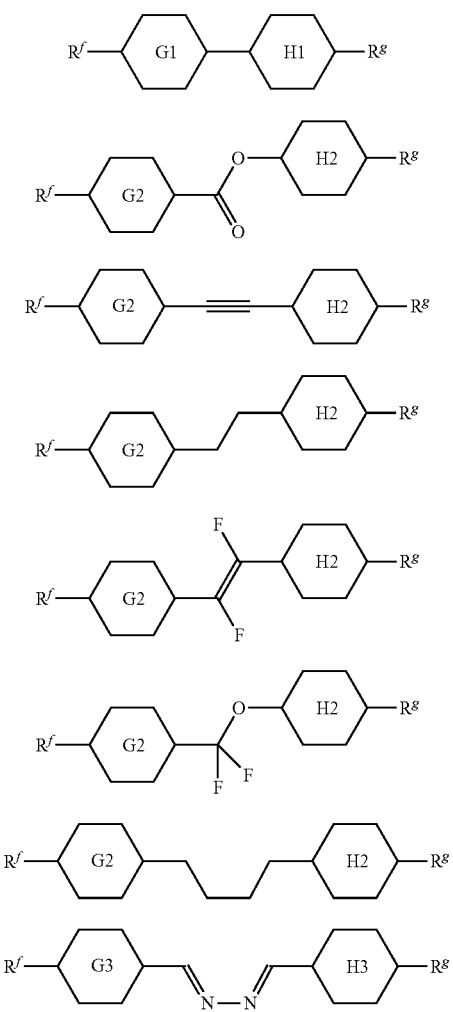

In the above formulae, $R^f$ and $R^g$ each independently represent a linear alkyl group having 1 to 7 carbon atoms, a linear 1-alkenyl group having 2 to 7 carbon atoms, a linear 3-alkenyl group having 4 to 7 carbon atoms, a linear alkoxyl group having 1 to 3 carbon atoms, or a linear alkyl group having 1 to 5 carbon atoms and terminated with an alkoxyl group having 1 to 3 carbon atoms. At least one of Rf and Rg represents a linear alkyl group having 1 to 7 carbon atoms, a linear 1-alkenyl group having 2 to 7 carbon atoms, or a linear 3-alkenyl group having 4 to 7 carbon atoms. When the ring G1 to the ring G3 are aromatic rings, $R^f$ corresponding to the aromatic ring represents a group other than the 1-alkenyl group and the alkoxyl group. When the ring H1 to the ring H3 are aromatic rings, $R^g$ corresponding to the aromatic ring represents a group other than the 1-alkenyl group and the alkoxyl group.

The ring G1 and the ring H1 each independently represent a trans-1,4-cyclohexylene group, a trans-decahydronaphthalene-trans-2,6-diyl group, a 1,4-phenylene group that may be substituted with 1 or 2 fluorine atoms or methyl groups, a naphthalene-2,6-diyl group that may be substituted with one or more fluorine atoms, a tetrahydronaphthalene-2,6-diyl group that may be substituted with 1 or 2 fluorine atoms, a 1,4-cyclohexenylene group that may be substituted with 1 or 2 fluorine atoms, a 1,3-dioxane-trans-2,5-diyl group, a pyrimidine-2,5-diyl group, or a pyridine-2,5-diyl group. In each of the compounds, the number of the trans-decahydronaphthalene-trans-2,6-diyl group, the naphthalene-2,6-diyl group that may be substituted with one or more fluorine atoms, the tetrahydronaphthalene-2,6-diyl group that may be substituted with 1 or 2 fluorine atoms, the 1,4-cyclohexenylene group that may be substituted with a fluorine atom, the 1,3-dioxane-trans-2,5-diyl group, the pyrimidine-2,5-diyl group, and the pyridine-2,5-diyl group is preferably within one. In this case, the other ring is a trans-1,4-cyclohexylene group or a 1,4-phenylene group that may be substituted with 1 or 2 fluorine atoms or methyl groups. The ring G2 and the ring H2 each independently represent a trans-1,4-cyclohexylene group, a trans-decahydronaphthalene-trans-2,6-diyl group, a 1,4-phenylene group that may be substituted with 1 or 2 fluorine atoms or methyl groups, a naphthalene-2,6-diyl group that may be substituted with one or more fluorine atoms, or a tetrahydronaphthalene-2,6-diyl group that may be substituted with 1 or 2 fluorine atoms. In each of the compounds, the number of the trans-decahydronaphthalene-trans-2,6-diyl group, the naphthalene-2,6-diyl group that may be substituted with one or more fluorine atoms, and the tetrahydronaphthalene-2,6-diyl group that may be substituted with 1 or 2 fluorine atoms is preferably within one. In this case, the other ring is a trans-1,4-cyclohexylene group or a 1,4-phenylene group that may be substituted with 1 or 2 fluorine atoms or methyl groups. The ring G3 and the ring H3 each independently represent a 1,4-phenylene group that may be substituted with 1 or 2 fluorine atoms or methyl groups, a naphthalene-2,6-diyl group that may be substituted with one or more fluorine atoms, or a tetrahydronaphthalene-2,6-diyl group that may be substituted with 1 or 2 fluorine atoms. In each of the compounds, the number of the naphthalene-2,6-diyl group that may be substituted with one or more fluorine atoms and the tetrahydronaphthalene-2,6-diyl group that may be substituted with 1 or 2 fluorine atoms is preferably within one.

These compounds are more preferably compounds below.

[Chem. 9]

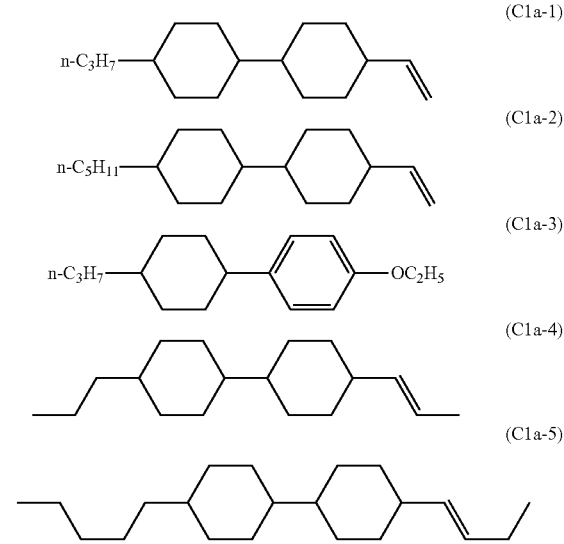

[Chem. 10]
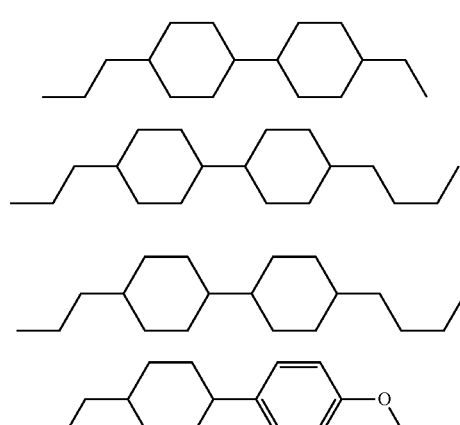
(C1a-6)
(C1a-7)
(C1a-8)
(C1a-8)
[Chem. 11]
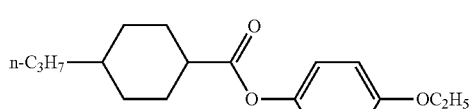
(C1b-1)
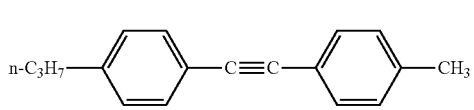
(C1c-1)
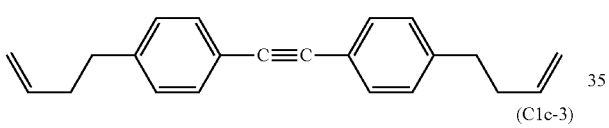
(C1c-2)
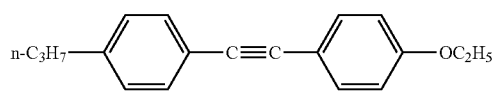
(C1c-3)
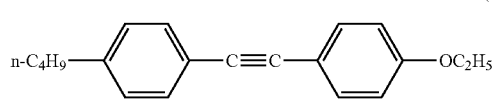
(C1c-4)
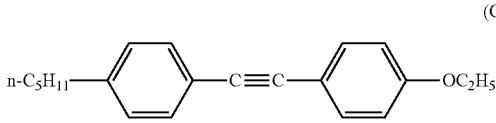
(C1c-5)
(C1c-6)
(C1c-7)
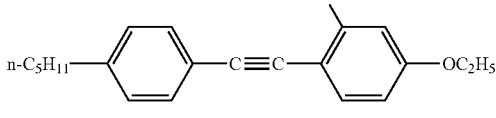
The compounds represented by the general formula (C2) can be more preferably represented by general formulae (C2a) to (C2m) below.
[Chem. 12]
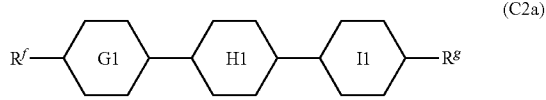
(C2a)
(C2b)
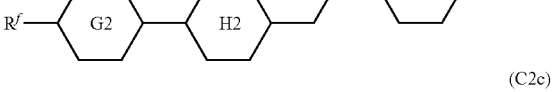
(C2c)
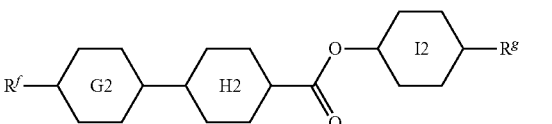
(C2d)
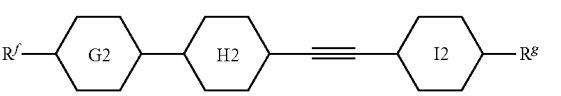
(C2e)
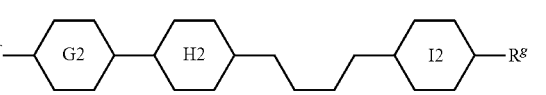
(C2f)
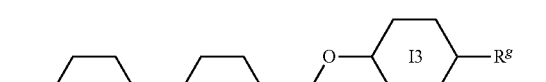
(C2g)
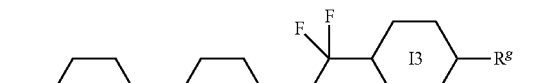
(C2h)
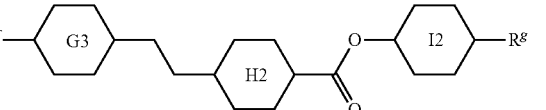
(C2i)
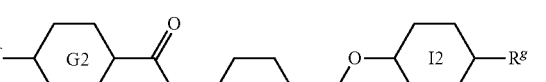
(C2j)
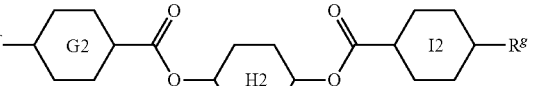
(C2k)

-continued

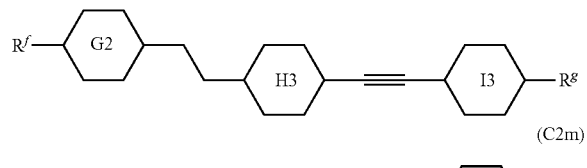
(C2l)

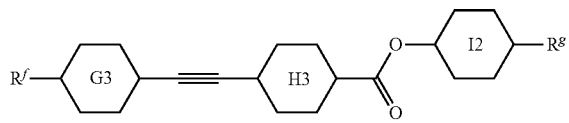
(C2m)

In the above formulae, the ring G1, the ring G2, the ring G3, the ring H1, the ring H2, and the ring H3 are the same as those described above. The ring I1 has the same meaning as the ring G1, the ring I2 has the same meaning as the ring G2, and the ring I3 has the same meaning as the ring G3. In each of the compounds, the number of the trans-decahydronaphthalene-trans-2,6-diyl group, the naphthalene-2,6-diyl group that may be substituted with one or more fluorine atoms, the tetrahydronaphthalene-2,6-diyl group that may be substituted with 1 or 2 fluorine atoms, the 1,4-cyclohexenylene group that may be substituted with a fluorine atom, the 1,3-dioxane-trans-2,5-diyl group, the pyrimidine-2,5-diyl group, and the pyridine-2,5-diyl group is preferably within one. In this case, the other rings are a trans-1,4-cyclohexylene group or a 1,4-phenylene group that may be substituted with 1 or 2 fluorine atoms or methyl groups.

These compounds are more preferably compounds below.

[Chem. 13]

(C2a-1)

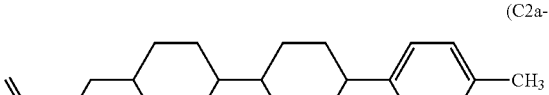
(C2a-2)

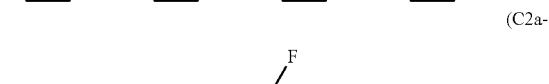
(C2a-3)

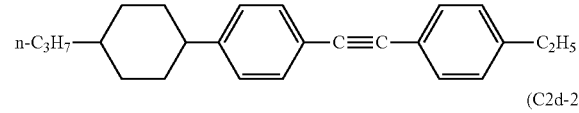
(C2d-1)

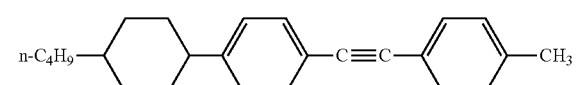
(C2d-2)

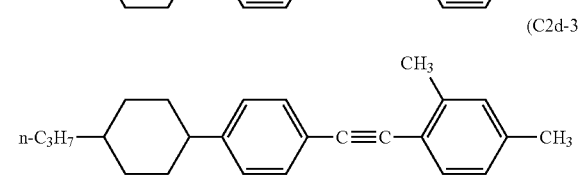
(C2d-3)

-continued

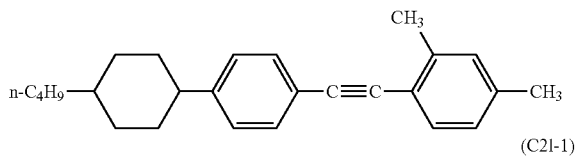
(C2d-4)

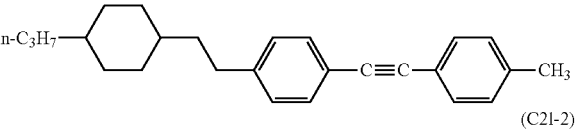
(C2l-1)

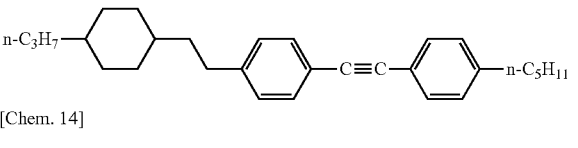
(C2l-2)

[Chem. 14]

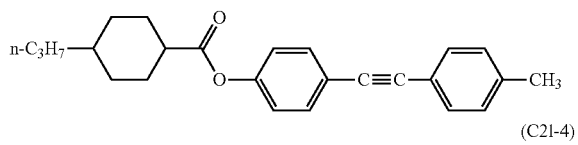
(C2l-3)

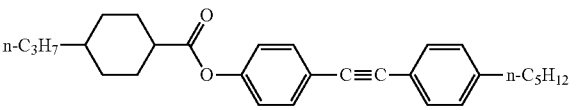
(C2l-4)

The compounds represented by the general formula (C3) can be more preferably represented by general formulae (C3a) to (C3f) below.

[Chem. 15]

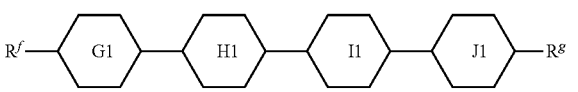
(C3a)

(C3b)

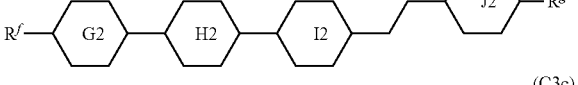
(C3c)

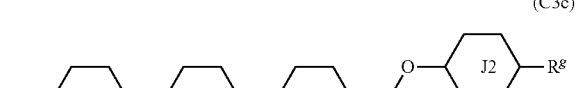
(C3d)

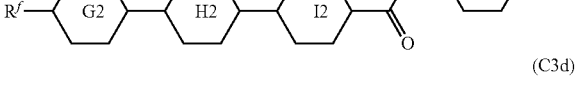
(C3e)

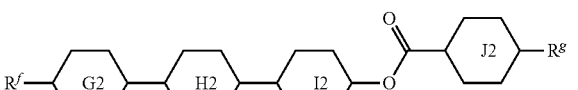

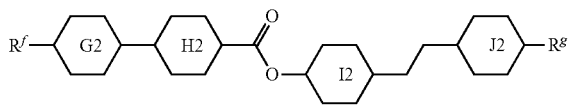

(C3f)

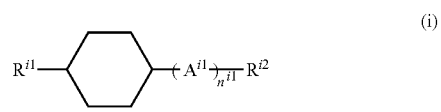

(i)

In the above formulae, the ring G1, the ring G2, the ring H1, the ring H2, the ring I1, and the ring I2 are the same as those described above. The ring J1 has the same meaning as the ring G1 and the ring J2 has the same meaning as the ring G2. In each of the compounds, the number of the trans-decahydronaphthalene-trans-2,6-diyl group, the naphthalene-2,6-diyl group that may be substituted with one or more fluorine atoms, the tetrahydronaphthalene-2,6-diyl group that may be substituted with 1 or 2 fluorine atoms, the 1,4-cyclohexenylene group that may be substituted with a fluorine atom, the 1,3-dioxane-trans-2,5-diyl group, the pyrimidine-2,5-diyl group, and the pyridine-2,5-diyl group is preferably within one. In this case, the other rings are a trans-1,4-cyclohexylene group or a 1,4-phenylene group that may be substituted with 1 or 2 fluorine atoms or methyl groups.

These compounds are more preferably compounds below.

[Chem. 16]

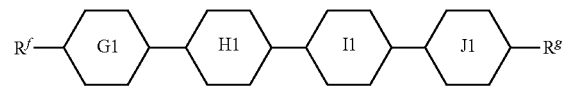

(C3a)

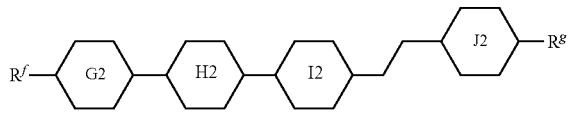

(C3b)

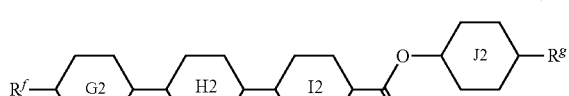

(C3c)

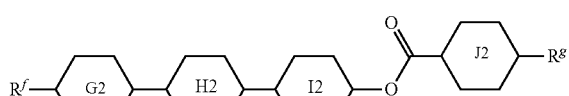

(C3d)

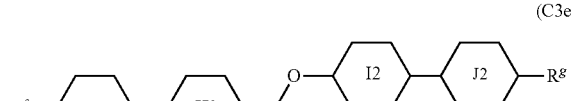

(C3e)

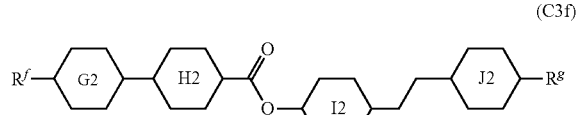

(C3f)

The compounds represented by the general formula (L) are preferably the compounds represented by the general formulae (C1a) and (C2a) and more preferably compounds represented by general formula (i).

(In the formula, $R^{i1}$ and $R^{i2}$ have the same meaning as $R^{L1}$ and $R^{L2}$ in the general formula (L), respectively, $A^{i1}$ has the same meaning as $A^{L2}$, and $n^{i1}$ represents 1 or 2, and a plurality of $A^{i1}$ present when $n^{i1}$ represents 2 may be the same or different.)

In the general formula (i), $R^{i1}$ preferably represents an alkyl group having 1 to 5 carbon atoms or an alkenyl group having 2 to 5 carbon atoms. $R^{i2}$ preferably represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms and more preferably an alkyl group having 1 to 5 carbon atoms or an alkenyl group having 2 to 5 carbon atoms. When an importance is given to the response speed of the device, at least one of $R^{i1}$ and $R^{i2}$ preferably represents an alkenyl group having 2 to 5 carbon atoms and more preferably an alkenyl group having 2 or 3 carbon atoms, and both of $R^{i1}$ and $R^{i2}$ preferably represent an alkenyl group having 2 to 5 carbon atoms and more preferably an alkenyl group having 2 or 3 carbon atoms. When an importance is given to the light resistance, UV resistance, or thermal resistance of the device, at least one of and $R^{i2}$ preferably represents an alkyl group having 1 to 5 carbon atoms or an alkoxy group having 1 to 5 carbon atoms and more preferably an alkyl group having 1 to 5 carbon atoms, and both of $R^{i1}$ and $R^{i2}$ preferably represent an alkyl group having 1 to 5 carbon atoms.

In the general formula (i), when an importance is given to the response speed of the device, $n^{i1}$ preferably represents 1. When an importance is given to the light resistance, UV resistance, or thermal resistance of the device, $n^{i1}$ preferably represents 2.

The liquid crystal composition according to the present invention preferably contains the compounds represented by the general formula (i) in an amount of 1 to 80 mass %. The lower limit of the content is preferably 1 mass %, more preferably 2 mass %, more preferably 3 mass %, more preferably 4 mass %, more preferably 5 mass %, more preferably 10 mass %, more preferably 15 mass %, more preferably 20 mass %, more preferably 25 mass %, or more preferably 30 mass %. The upper limit of the content is preferably 80 mass %, more preferably 75 mass %, more preferably 70 mass %, more preferably 65 mass %, more preferably 60 mass %, more preferably 55 mass %, or more preferably 50 mass %.

When the liquid crystal composition according to the present invention has a negative dielectric anisotropy (Δε), the liquid crystal composition preferably further contains one or two or more compounds represented by general formula (N). The compounds represented by the general formula (N) are dielectrically negative compounds in which the absolute value of Δε with a negative sign is preferably more than 2 and more preferably more than 3. The compounds represented by the general formula (N) may be used alone or in combination. The types of compounds that can be combined with each other are not particularly limited. These compounds are appropriately combined with each other in accordance with the desired performance such as the solubility at low temperature, the transition temperature, or the birefringence.

[Chem. 18]

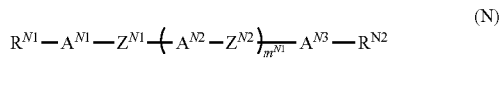

(N)

(In the formula, $R^{N1}$ and $R^{N2}$ each independently represent an alkyl group having 1 to 12 carbon atoms, where one —CH$_2$— or two or more non-adjacent —CH$_2$— in the alkyl group may be each independently substituted with —CH=CH—, —C≡C—, —O—, —CO—, —COO—, or —OCO—;

$m^{N1}$ represents 0, 1, 2, or 3;

$A^{N1}$, $A^{N2}$, and $A^{N3}$ each independently represent a group selected from the group consisting of (a) a 1,4-cyclohexylene group (one —CH$_2$— or two or more non-adjacent —CH$_2$— in this group may be substituted with —O—), (b) a 1,4-phenylene group (one —CH= or two or more non-adjacent —CH= in this group may be substituted with —N=), and (c) 1,4-cyclohexenylene, 1,4-bicyclo(2.2.2)octylene, piperidine-1,4-diyl, naphthalene-2,6-diyl, decahydronaphthalene-2,6-diyl, and 1,2,3,4-tetrahydronaphthalene-2,6-diyl, where the group (a), the group (b), and the groups (c) may be each independently substituted with an alkyl group having 1 to 3 carbon atoms, an alkenyl group having 2 or 3 carbon atoms, alkoxyl having 1 to 3 carbon atoms, an alkenyloxy group having 1 to 3 carbon atoms, a cyano group, or a fluorine atom, and at least one of $A^{N1}$, $A^{N2}$, and $A^{N3}$ represents a 2,3-difluoro-1,4-phenylene group, a 1,7,8-trifluoronaphthalene-2,6-diyl group, or a 3,4,5-trifluoronaphthalene-2,6-diyl group;

$Z^{N1}$ and $Z^{N2}$ each independently represent a single bond, —CH$_2$CH$_2$—, —(CH$_2$)$_4$—, —OCH$_2$—, —CH$_2$O—, —COO—, —CH=N—N=CH—, —CH=CH—, or —CF=CF—; and when $m^{N1}$ represents 2 or 3 and a plurality of $A^{N2}$ and a plurality of $Z^{N2}$ are present, $A^{N2}$ may be the same or may be independently different from each other and $Z^{N2}$ may be the same or may be independently different from each other.)

In the general formula (N), $R^{N1}$ and $R^{N2}$ preferably each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, more preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, more preferably an alkyl group having 1 to 5 carbon atoms or an alkenyl group having 2 to 5 carbon atoms, more preferably an alkyl group having 2 to 5 carbon atoms or an alkenyl group having 2 or 3 carbon atoms, and particularly preferably an alkenyl group having 3 carbon atoms (propenyl group).

When the ring structures to which $R^{N1}$ and $R^{N2}$ bond are phenyl groups (aromatic groups), $R^{N1}$ and $R^{N2}$ preferably represent a linear alkyl group having 1 to 5 carbon atoms, a linear alkoxy group having 1 to 4 carbon atoms, or an alkenyl group having 4 or 5 carbon atoms. When the ring structures to which $R^{N1}$ and $R^{N2}$ bond are saturated ring structures such as cyclohexane, pyran, and dioxane, $R^{N1}$ and $R^{N2}$ preferably represent a linear alkyl group having 1 to 5 carbon atoms, a linear alkoxy group having 1 to 4 carbon atoms, or a linear alkenyl group having 2 to 5 carbon atoms. To stabilize the nematic phase, the total number of carbon atoms and, if present, oxygen atoms is preferably 5 or less and a linear chain is preferably employed.

The alkenyl group is preferably selected from groups represented by formula (R1) to formula (R5) (the black circle in each of the formulae represents a carbon atom in a ring structure).

[Chem. 19]

 (R1)

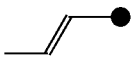 (R2)

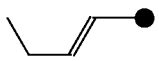 (R3)

 (R4)

 (R5)

When Δn needs to be increased, $A^{N1}$, $A^{N2}$, $A^{N21}$, and $A^{23}$ preferably each independently represent an aromatic group. To improve the response speed, $A^{N1}$, $A^{N2}$, $A^{N21}$, and $A^{23}$ preferably each independently represent an aliphatic group. $A^{N1}$, $A^{N2}$, $A^{N21}$, and $A^{23}$ preferably each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group and more preferably each independently represent the following structures.

[Chem. 20]

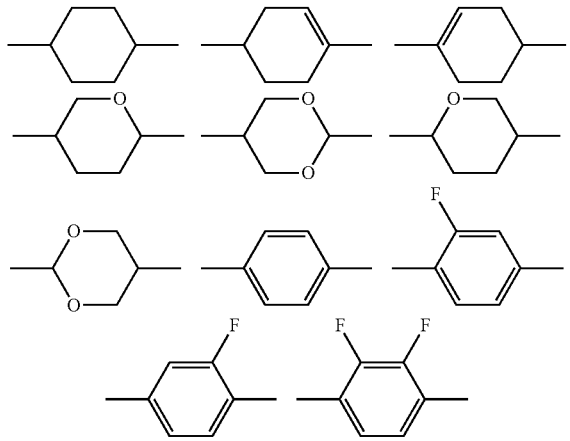

$A^{N1}$, $A^{N2}$, $A^{N21}$, and $A^{23}$ more preferably each independently represent a trans-1,4-cyclohexylene group, a 1,4-cyclohexenylene group, or a 1,4-phenylene group.

$Z^{N11}$ and $Z^{N12}$ preferably each independently represent —CH$_2$O—, —CF$_2$O—, —CH$_2$CH$_2$—, —CF$_2$CF$_2$—, or a single bond, more preferably —CH$_2$O—, —CH$_2$CH$_2$—, or a single bond, and particularly preferably —CH$_2$O— or a single bond.

$m^{N1}$ preferably represents 0, 1, or 2. To decrease the viscosity, $m^{N1}$ preferably represents 0. To increase the transition temperature, $m^{N1}$ preferably represents 1.

The lower limit of the preferred content of the compounds represented by the formula (N) relative to the total amount of the composition according to the present invention is 1%, 10%, 20%, 30%, 40%, 50%, 55%, 60%, 65%, 70%, 75%, or 80%. The upper limit of the preferred content is 95%, 85%, 75%, 65%, 55%, 45%, 35%, 25%, or 20%.

When the composition according to the present invention needs to have a low viscosity and contribute to a high response speed, the lower limit and the upper limit are preferably low. When the composition according to the present invention needs to be a highly reliable composition that contributes to a high specific resistance and a high VHR, the lower limit and the upper limit are preferably low. When the dielectric anisotropy is increased to maintain a low driving voltage, the lower limit and the upper limit are preferably high.

The composition preferably contains compounds represented by general formula (N-i) as the compounds represented by the general formula (N).

[Chem. 21]

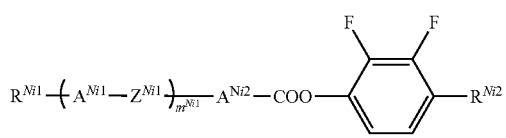

(N-i)

(In the formula, $R^{Ni1}$, $R^{Ni2}$, $Z^{Ni1}$, and $m^{Ni1}$ have the same meaning as $R^{N1}$, $R^{N2}$, $Z^{N1}$, and $m^{N1}$ in the general formula (N), respectively, $A^{Ni1}$ and $A^{Ni2}$ each independently represent a group selected from the group consisting of (a) a 1,4-cyclohexylene group (one —CH$_2$— or two or more non-adjacent —CH$_2$— in this group may be substituted with —O— and/or —S—), (b) a 1,4-phenylene group (one —CH= or two or more non-adjacent —CH= in this group may be substituted with —N=), and (c) 1,4-cyclohexenylene, 1,4-bicyclo(2.2.2)octylene, piperidine-1,4-diyl, naphthalene-2,6-diyl, decahydronaphthalene-2,6-diyl, and 1,2,3,4-tetrahydronaphthalene-2,6-diyl, where hydrogen atoms on the group (a), the group (b), and the groups (c) may be each independently substituted with an alkyl group having 1 to 3 carbon atoms, an alkenyl group having 2 or 3 carbon atoms, alkoxyl having 1 to 3 carbon atoms, an alkenyloxy group having 1 to 3 carbon atoms, CN, or a halogen.)

$A^{Ni1}$ and $A^{Ni2}$ preferably each independently represent a trans-1,4-cyclohexylene group or a 1,4-phenylene group. To decrease the viscosity, $A^{Ni1}$ and $A^{Ni2}$ more preferably represent a trans-1,4-cyclohexylene group. To increase the birefringent anisotropy, $A^{Ni1}$ and $A^{Ni2}$ more preferably represent a 1,4-phenylene group. $A^{Ni1}$ and $A^{Ni2}$ are preferably not substituted.

The composition preferably contains, as the compounds represented by the general formula (N), one or two or more compounds selected from compounds represented by general formula (V) or general formula (VI).

[Chem. 22]

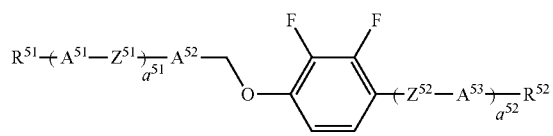

(V)

(VI)

In the formulae, $R^{51}$ and $R^{61}$ each independently have the same meaning as $R^{N1}$ in the general formula (N), and $R^{52}$ and $R^{62}$ each independently have the same meaning as $R^{N2}$ in the general formula (N).

$A^{51}$, $A^{52}$, $A^{53}$, $A^{61}$, $A^{62}$, and $A^{63}$ each independently represent a trans-1,4-cyclohexylene group, a 1,4-phenylene group, or 1,4-cyclohexenylene, where one or two or more hydrogen atoms present on the 1,4-phenylene group may be each independently substituted with halogens. In the present invention, $A^{51}$, $A^{52}$, $A^{53}$, $A^{61}$, $A^{62}$, and $A^{63}$ preferably each independently represent a trans-1,4-cyclohexylene group or a 1,4-phenylene group. To decrease the viscosity, a trans-1,4-cyclohexylene group is preferred. To increase the birefringence, a 1,4-phenylene group is preferred.

$Z^{51}$, $Z^{52}$, $Z^{61}$, and $Z^{62}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —C≡C—, or —CF=CF—. In the present invention, $Z^{51}$, $Z^{52}$, $Z^{61}$, and $Z^{62}$ preferably each independently represent —CH$_2$O—, —OCH$_2$—, or a single bond.

$a^{51}$, $a^{52}$, $a^{61}$, and $a^{62}$ each independently represent 0, 1, or 2, where $a^{51}+a^{52}$ represents 0, 1, or 2 and $a^{61}+a^{62}$ represents 0, 1, or 2. When $a^{51}$ represents 2, two $A^{51}$ may be the same or different. When $a^{52}$ represents 2, two $A^{52}$ may be the same or different. When $a^{51}$ represents 2, two $Z^{51}$ may be the same or different. When $a^{52}$ represents 2, two $Z^{52}$ may be the same or different. When $a^{61}$ represents 2, two $A^{61}$ may be the same or different. When $a^{62}$ represents 2, two $A^{62}$ may be the same or different. When $a^{61}$ represents 2, two $Z^{61}$ may be the same or different. When $a^{62}$ represents 2, two $Z^{62}$ may be the same or different. In the present invention, when the viscosity is decreased, $a^{51}$, $a^{52}$, $a^{61}$, and $a^{62}$ preferably each independently represent 0. When the transition temperature is increased, $a^{51}+a^{52}$ and $a^{61}+a^{62}$ preferably represent 1 or 2.

The composition preferably contains compounds represented by general formula (N-1d) as the compounds represented by the general formula (V).

[Chem. 23]

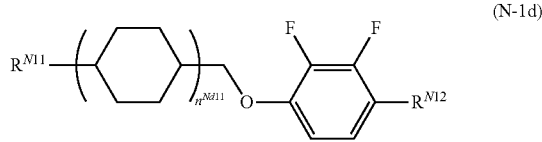
(N-1d)

(In the formula, $R^{N11}$ and $R^{N12}$ have the same meaning as $R^{N1}$ and $R^{N2}$ in the general formula (N), respectively, and $n^{Nd11}$ represents 1 or 2.)

The composition can contain one or more compounds represented by general formulae (N-1a) to (N-1g) below as the compounds represented by the general formula (N).

[Chem. 24]

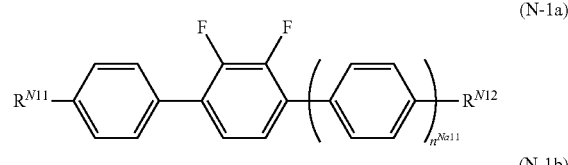
(N-1a)

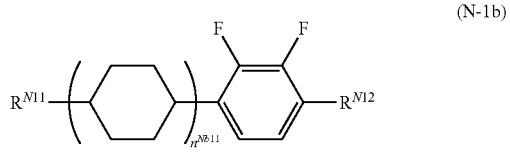
(N-1b)

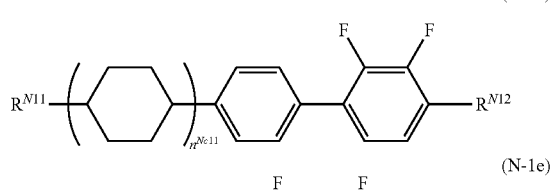
(N-1c)

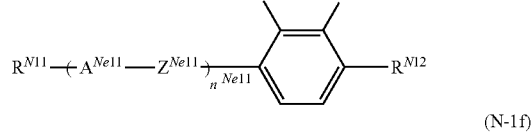
(N-1e)

(N-1f)

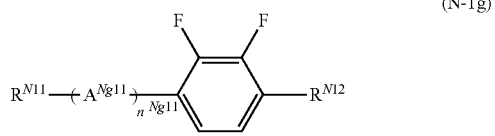
(N-1g)

(In the formulae, $R^{N11}$ and $R^{N12}$ have the same meaning as $R^{N1}$ and $R^{N2}$ in the general formula (N), respectively, $n^{Na11}$ represents 0 or 1, $n^{Nb11}$ represents 1 or 2, $n^{Nc11}$ represents 0 or 1, $n^{Ne11}$ represents 1 or 2, $n^{Nf11}$ represents 1 or 2, and $n^{Ng11}$ represents 1 or 2. $A^{Ng11}$ represents a trans-1,4-cyclohexylene group or a 1,4-phenylene group. $A^{Ng11}$ represents a trans-1,4-cyclohexylene group, a 1,4-cyclohexenylene group, or a 1,4-phenylene group, where at least one of $A^{Ng11}$ represents a 1,4-cyclohexenylene group. $Z^{Ne11}$ represents a single bond or ethylene, where at least one of $Z^{Ne11}$ represents ethylene.)

When the liquid crystal composition according to the present invention has a positive dielectric anisotropy (Δε), the liquid crystal composition preferably further contains one or two or more compounds selected from the group of compounds represented by general formulae (A1) to (A3) and general formulae (B1) to (B3) below. The compounds selected from the group of compounds represented by the general formulae (A1) to (A3) and the general formulae (B1) to (B3) are dielectrically positive compounds in which the absolute value of Δε with a positive sign is preferably more than 2. The compounds selected from the group of compounds represented by the general formulae (A1) to (A3) and the general formulae (B1) to (B3) may be used alone or in combination. The types of compounds that can be combined with each other are not particularly limited. These compounds are appropriately combined with each other in accordance with the desired performance such as the solubility at low temperature, the transition temperature, or the birefringence.

The compounds represented by the general formulae (A1) to (A3) are so-called fluorine-based (halogen-based) p-type compounds.

[Chem. 25]

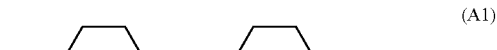
(A1)

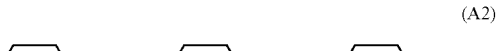
(A2)

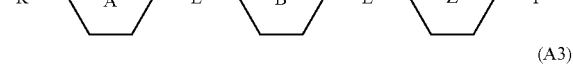
(A3)

(In the formulae, $R^b$ represents an alkyl group having 1 to 12 carbon atoms, where the alkyl group may be a linear group or may have a methyl or ethyl branch and may have a three- to six-membered ring structure, any of —CH$_2$— present in the group may be substituted with —O—, —CH=CH—, —CH=CF—, —CF=CH—, —CF=CF—, or and any hydrogen atom present in the group may be substituted with a fluorine atom or a trifluoromethoxy group, and when an asymmetric carbon atom is generated due to branching, the compound may be an optically active compound or a racemate;

The ring A, the ring B, and the ring C each independently represent a trans-1,4-cyclohexylene group, a trans-decahydronaphthalene-trans-2,6-diyl group, a 1,4-phenylene group that may be substituted with one or more fluorine atoms, a naphthalene-2,6-diyl group that may be substituted with one or more fluorine atoms, a tetrahydronaphthalene-2,6-diyl group that may be substituted with one or more fluorine atoms, a 1,4-cyclohexenylene group that may be substituted with a fluorine atom, a 1,3-dioxane-trans-2,5-diyl group, a pyrimidine-2,5-diyl group, or a pyridine-2,5-diyl group;

$L^a$, $L^b$, and $L^c$ each independently represent a single bond, an ethylene group (—CH$_2$CH$_2$—), a 1,2-propylene group (—CH(CH$_3$)CH$_2$— and —CH$_2$CH(CH$_3$)—), a 1,4-butylene group, —COO—, —OCO—, —OCF$_2$—, —CF$_2$O—, —CH=CH—, —CH=CF—, —CF=CH—, —CF=CF—, or —CH=NN=CH—;

the ring Z represents substituents represented by general formulae (La) to (Lc),

[Chem. 26]

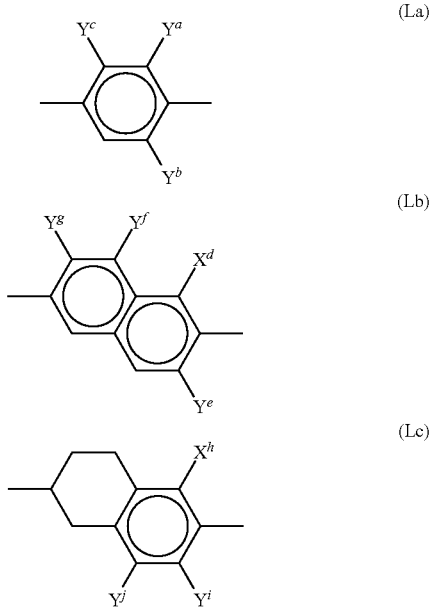

(in the formulae, $Y^a$ to $Y^j$ each independently represent a hydrogen atom or a fluorine atom); and $P^a$ represents a fluorine atom, a chlorine atom, a trifluoromethoxy group, a difluoromethoxy group, a trifluoromethyl group, a difluoromethyl group, or an alkoxyl group, alkyl group, alkenyl group, or alkenyloxy group that is substituted with two or more fluorine atoms and has 2 or 3 carbon atoms.)

$R^b$ preferably represents a linear alkyl group having 1 to 7 carbon atoms, a linear 1-alkenyl group having 2 to 7 carbon atoms, a linear 3-alkenyl group having 4 to 7 carbon atoms, and an alkyl group having 1 to 5 carbon atoms and terminated with an alkoxyl group having 1 to 3 carbon atoms.

The ring A, the ring B, and the ring C preferably represent a trans-1,4-cyclohexylene group, a trans-decahydronaphthalene-trans-2,6-diyl group, a naphthalene-2,6-diyl group that may be substituted with a fluorine atom, or a 1,4-phenylene group that may be substituted with 1 or 2 fluorine atoms. In particular, when the ring B represents a trans-1,4-cyclohexylene group or a trans-decahydronaphthalene-trans-2,6-diyl group, the ring A preferably represents a trans-1,4-cyclohexylene group. When the ring C represents a trans-1,4-cyclohexylene group or a trans-decahydronaphthalene-trans-2,6-diyl group, the ring B and the ring A preferably represent a trans-1,4-cyclohexylene group. In the general formula (A3), the ring A preferably represents a trans-1,4-cyclohexylene group.

$L^a$, $L^b$, and $L^c$ preferably represent a single bond, an ethylene group, a 1,4-butylene group, —COO—, —OCF$_2$—, —CF$_2$O—, —CF=CF—, or —C≡C— and particularly preferably a single bond or an ethylene group. In the general formula (A2), at least one of $L^a$ and $L^b$ preferably represents a single bond. In the general formula (A3), at least two of $L^a$, $L^b$, and $L^c$ preferably represent a single bond.

For the ring Z, at least one of $Y^a$ and $Y^b$ in the general formula (La) preferably represents a fluorine atom, and at least one of $Y^d$ to $Y^f$ in the general formula (Lb) preferably represents a fluorine atom and $Y^d$ more preferably represents a fluorine atom.

The terminal group $P^a$ preferably represents a fluorine atom, a trifluoromethoxy group, or a difluoromethoxy group and particularly preferably a fluorine atom.

When the compounds represented by the general formulae (A1) to (A3) are used in combination, the same alternatives (e.g., ring A and $L^a$) in different molecules may represent the same substituent or different substituents.

In the general formulae (A1) to (A3), the general formula (i) according to the present invention are excluded.

The lower limit of the preferred content of the compounds represented by the general formulae (A1) to (A3) relative to the total amount of the composition according to the present invention is 1%, 2%, 5%, 8%, 10%, 13%, 15%, 18%, 20%, 22%, 25%, 30%, 40%, 50%, 55%, 60%, 65%, 70%, 75%, or 80%. The upper limit of the preferred content is 85%, 75%, 65%, 55%, 45%, 35%, 30%, 28%, 25%, 23%, 20%, 18%, 15%, 13%, 10%, 8%, or 5%.

When the composition according to the present invention needs to have a low viscosity and contribute to a high response speed, the lower limit and the upper limit are preferably increased. When the composition according to the present invention needs to be a highly reliable composition that contributes to a high specific resistance and a high VHR, the lower limit and the upper limit are preferably decreased. When the dielectric anisotropy is increased to maintain a low driving voltage, the lower limit and the upper limit are preferably increased.

The compounds represented by the general formulae (A1) to (A3) can be more preferably represented by general formulae (A1a) to (A3c) below.

[Chem. 27]

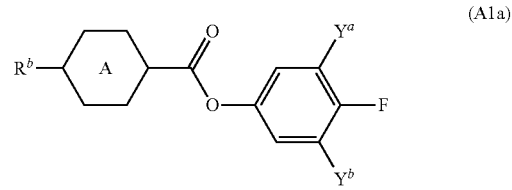

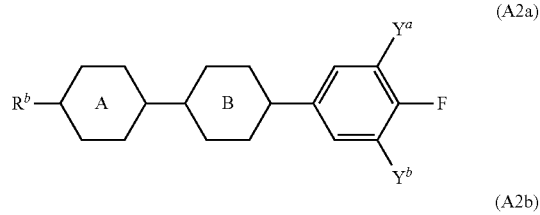

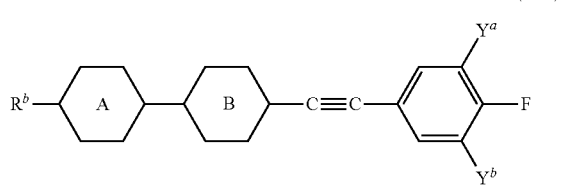

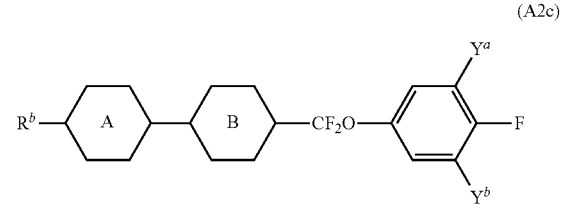

(A3a)
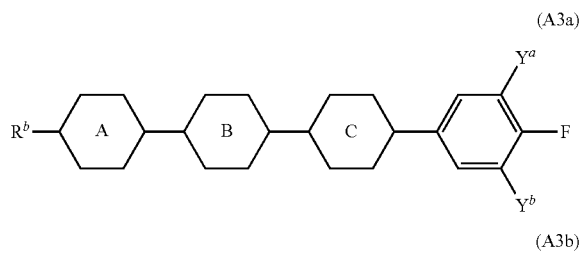
(A3b)
(A3c)
(In the formulae, A, B, C, $Y^a$, and $Y^b$ have the same meaning as A, B, C, $Y^a$, and $Y^b$ in the general formulae (A1) to (A3), respectively.)
These compounds are more preferably compounds below.
[Chem. 28]
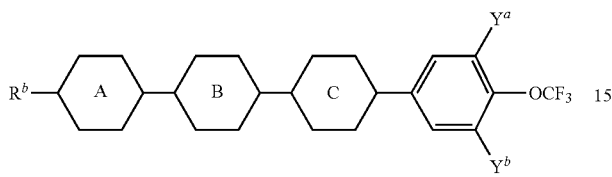
(A1a-1)
(A1a-2)
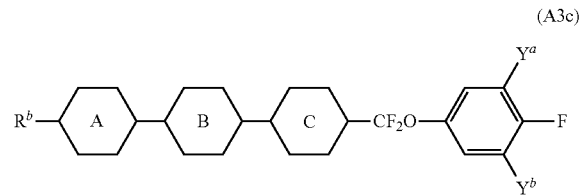
(A2a-1)
(A2a-2)
(A2b-1)
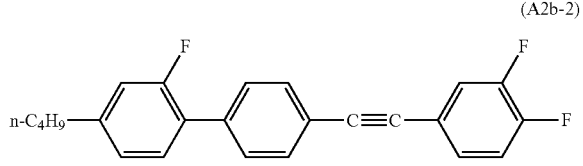
(A2b-2)
(A2b-3)
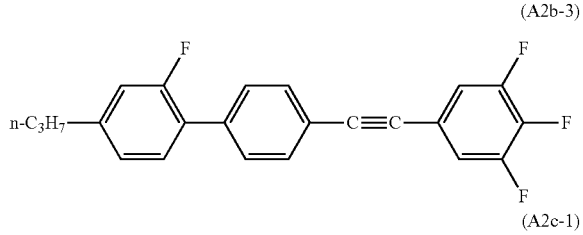
(A2c-1)
(A2c-2)
[Chem. 29]
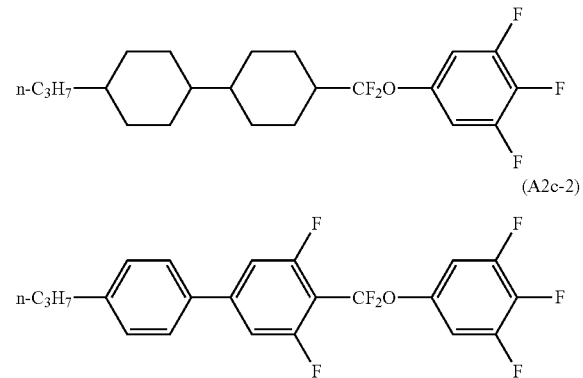
(A3a-1)
(A3a-2)
(A3a-3)
(A3a-4)
(A3b-1)

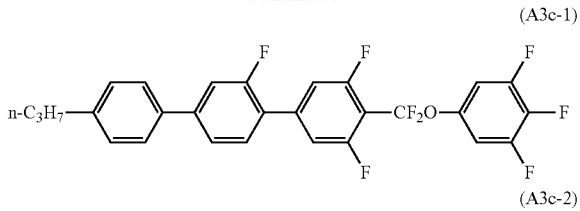
(A3c-1)

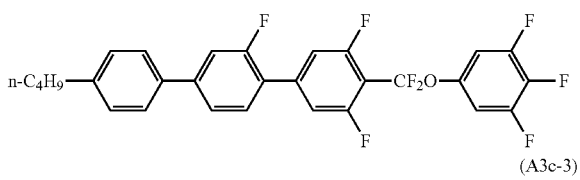
(A3c-2)

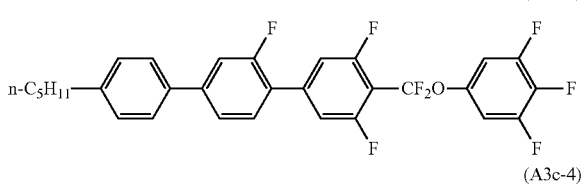
(A3c-3)

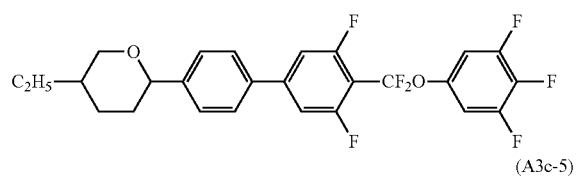
(A3c-4)

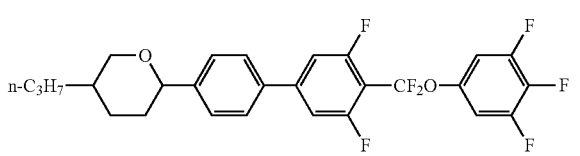
(A3c-5)

The compounds represented by the general formulae (B1) to (B3) are so-called cyano-based p-type compounds.

[Chem. 30]

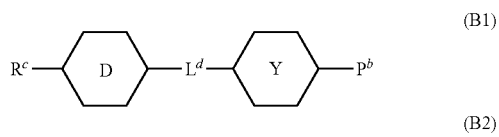
(B1)

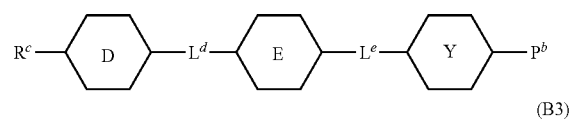
(B2)

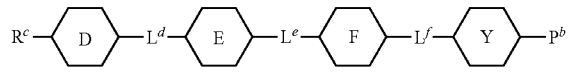
(B3)

(In the formulae, $R^c$ represents an alkyl group having 1 to 12 carbon atoms, where the alkyl group may be a linear group or may have a methyl or ethyl branch and may have a three- to six-membered ring structure, any of —CH$_2$— present in the group may be substituted with —O—, —CH=CH—, —CH=CF—, —CF=CH—, —CF=CF—, or and any hydrogen atom present in the group may be substituted with a fluorine atom or a trifluoromethoxy group, and when an asymmetric carbon atom is generated due to branching, the compound may be an optically active compound or a racemate;

the ring D, the ring E, and the ring F each independently represent a trans-1,4-cyclohexylene group, a trans-decahydronaphthalene-trans-2,6-diyl group, a 1,4-phenylene group that may be substituted with one or more fluorine atoms, a naphthalene-2,6-diyl group that may be substituted with one or more fluorine atoms, a tetrahydronaphthalene-2,6-diyl group that may be substituted with one or more fluorine atoms, a 1,4-cyclohexenylene group that may be substituted with a fluorine atom, a 1,3-dioxane-trans-2,5-diyl group, a pyrimidine-2,5-diyl group, or a pyridine-2,5-diyl group;

$L^d$, $L^e$, and $L^f$ each independently represent a single bond, an ethylene group (—CH$_2$CH$_2$—), a 1,2-propylene group (—CH(CH$_3$)CH$_2$— and —CH$_2$CH(CH$_3$)—), a 1,4-butylene group, —COO—, —OCO—, —OCF$_2$—, —CF$_2$O—, —CH=CH—, —CH=CF—, —CF=CH—, —CF=CF—, —OCH$_2$—, —CH$_2$O—, or —CH=NN=CH—;

the ring Y is an aromatic ring and represents substituents represented by general formulae (Ld) to (Lf) below,

[Chem. 31]

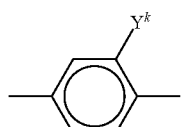
(Ld)

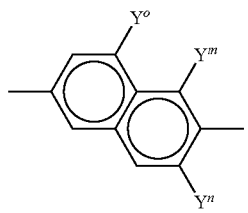
(Le)

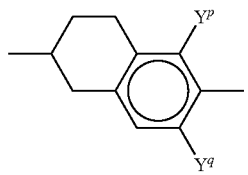
(Lf)

(in the formulae, $Y^k$ to $Y^q$ each independently represent a hydrogen atom or a fluorine atom); and the terminal group $P^b$ represents a cyano group (—CN), a cyanato group (—OCN), or —C≡CCN.)

$R^c$ preferably represents a linear alkyl group having 1 to 7 carbon atoms, a linear 1-alkenyl group having 2 to 7 carbon atoms, a linear 3-alkenyl group having 4 to 7 carbon atoms, or an alkyl group having 1 to 5 carbon atoms and terminated with an alkoxyl group having 1 to 3 carbon atoms.

The ring D, the ring E, and the ring F preferably represent a trans-1,4-cyclohexylene group, a trans-decahydronaphthalene-trans-2,6-diyl group, a naphthalene-2,6-diyl group that may be substituted with a fluorine atom, or a 1,4-phenylene group that may be substituted with 1 or 2 fluorine atoms. In particular, when the ring E represents a trans-1,4-cyclohexylene group or a trans-decahydronaphthalene-trans-2,6-diyl group, the ring D preferably represents a trans-1,4-cyclohexylene group. When the ring F represents a trans-1,4-cyclohexylene group or a trans-decahydronaphthalenetrans-2,6-diyl group, the ring D and the ring E preferably represent a trans-1,4-cyclohexylene group. In the general formula (B3), the ring D preferably represents a trans-1,4-cyclohexylene group.

$L^d$, $L^e$, and $L^f$ preferably represent a single bond, an ethylene group, —COO—, —OCF$_2$—, —CF$_2$O—, —CF═CF—, or —C≡C— and particularly preferably a single bond, an ethylene group, or —COO—. In the general formula (B2), at least one of $L^d$ and $L^e$ preferably represents a single bond. In the general formula (B3), at least two of $L^d$, $L^e$, and $L^f$ preferably represent a single bond.

For the ring Y, $Y^m$ in the general formula (Le) preferably represents a fluorine atom.

The terminal group $P^b$ preferably represents a cyano group.

When the compounds represented by the general formulae (B1) to (B3) are used in combination, the same alternatives (e.g., ring D and $L^d$) in different molecules may represent the same substituent or different substituents.

In the general formulae (B1) to (B3), the general formula (i) according to the present invention are excluded.

The lower limit of the preferred content of the compounds represented by the general formulae (B1) to (B3) relative to the total amount of the composition according to the present invention is 1%, 2%, 5%, 8%, 10%, 13%, 15%, 18%, 20%, 22%, 25%, 30%, 40%, 50%, 55%, 60%, 65%, 70%, 75%, or 80%. The upper limit of the preferred content is 85%, 75%, 65%, 55%, 45%, 35%, 30%, 28%, 25%, 23%, 20%, 18%, 15%, 13%, 10%, 8%, or 5%.

When the composition according to the present invention needs to have a low viscosity and contribute to a high response speed, the lower limit is preferably decreased and the upper limit is preferably increased. When the composition according to the present invention needs to be a highly reliable composition that contributes to a high specific resistance and a high VHR, the lower limit is preferably decreased and the upper limit is preferably increased. When the dielectric anisotropy is increased to maintain a low driving voltage, the lower limit and the upper limit are preferably increased.

The compounds represented by the general formulae (B1) to (B3) can be more preferably represented by general formulae (B1a) to (B2c) below.

[Chem. 32]

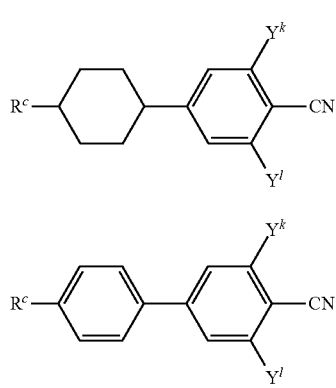

(B1a)

(B1b)

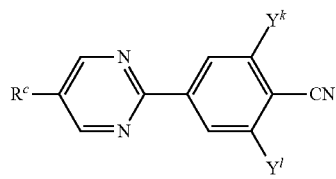

(B1c)

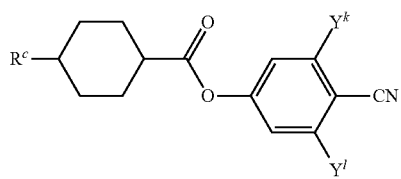

(B1d)

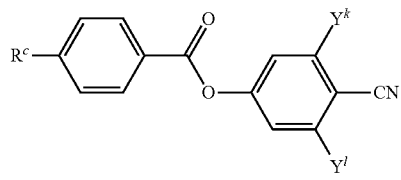

(B1e)

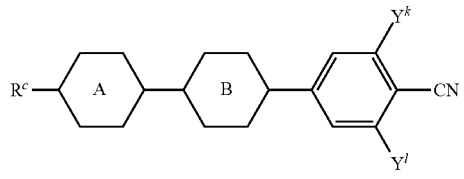

(B2a)

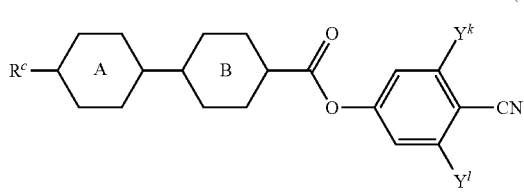

(B2b)

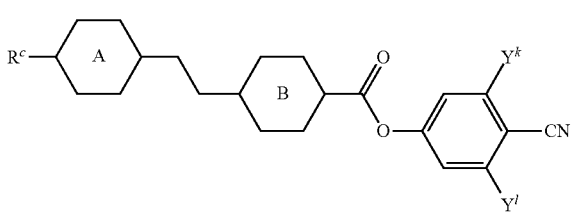

(B2c)

(In the formulae, A, B, $Y^k$, and $Y^l$ have the same meaning as A, B, $Y^k$, and $Y^l$ in the general formulae (B1) to (B3), respectively.)

These compounds are more preferably compounds below.

[Chem. 33]

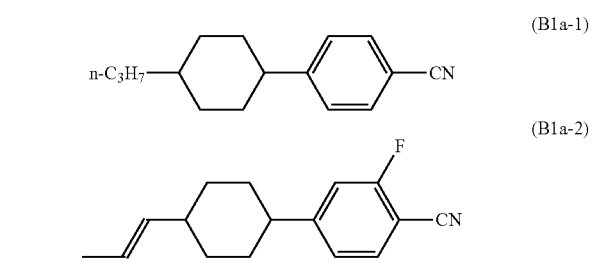

(B1a-1)

(B1a-2)

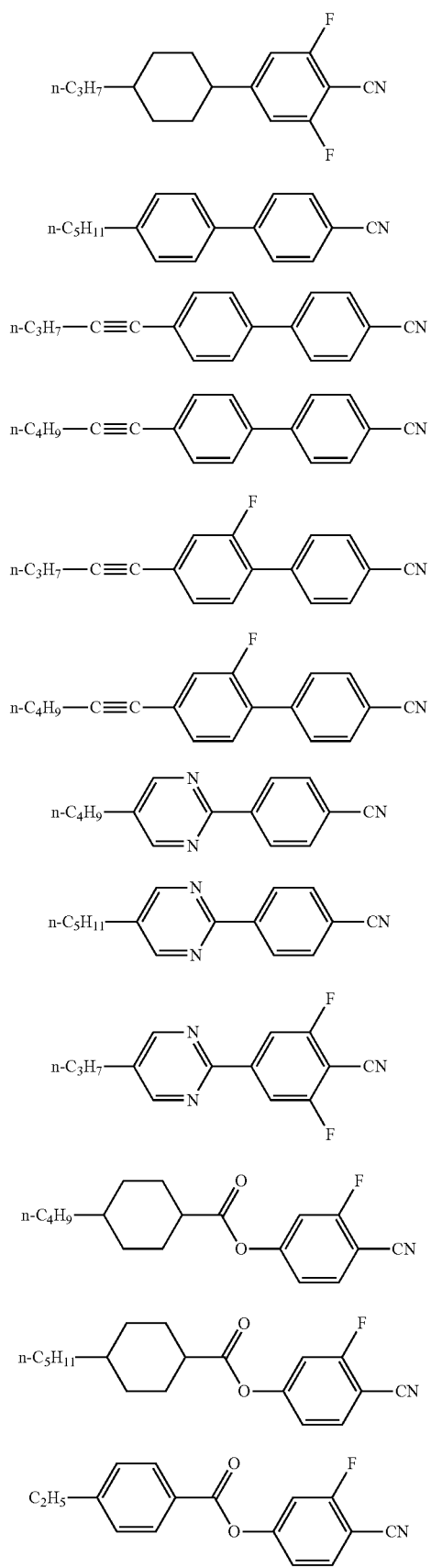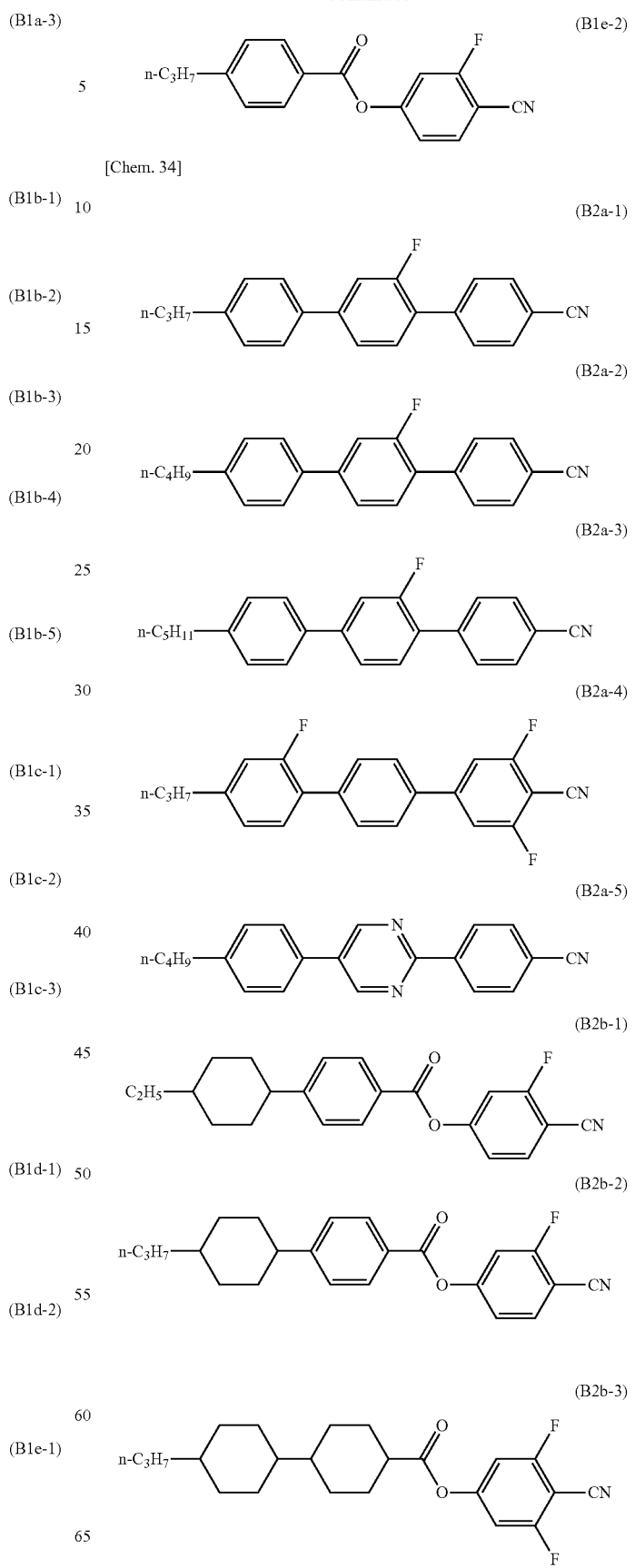

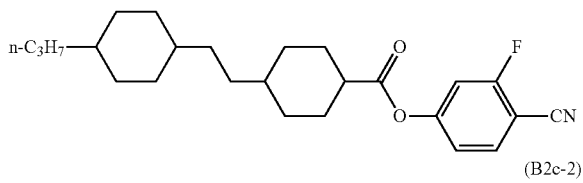

(B2c-1)

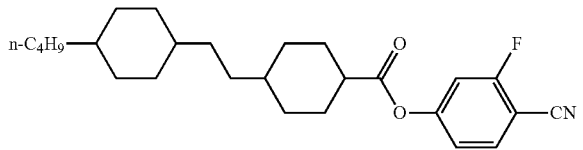

(B2c-2)

The liquid crystal composition according to the present invention preferably contains three or four or more dichroic dyes selected from disazo compounds and trisazo compounds, the compounds represented by the general formula (L), and the compounds represented by the general formula (N) at the same time and more preferably contains three or four or more dichroic dyes selected from disazo compounds and trisazo compounds, the compounds represented by the general formula (i), and the compounds represented by the general formula (N) at the same time.

The liquid crystal composition according to the present invention preferably contains three or four or more dichroic dyes selected from disazo compounds and trisazo compounds, the compounds represented by the general formula (L), and the compounds represented by the general formula (N-i) at the same time and more preferably contains three or four or more dichroic dyes selected from disazo compounds and trisazo compounds, the compounds represented by the general formula (L), the compounds represented by the general formula (N-i), and the compounds represented by the general formula (V) or the general formula (VI) at the same time.

The liquid crystal composition according to the present invention preferably contains three or four or more dichroic dyes selected from disazo compounds and trisazo compounds, the compounds represented by the general formula (L), and the compounds represented by the general formula (V) or the general formula (VI) at the same time and more preferably contains three or four or more dichroic dyes selected from disazo compounds and trisazo compounds, the compounds represented by the general formula (L), and the compounds represented by the general formula (V) at the same time.

The liquid crystal composition according to the present invention preferably contains three or four or more dichroic dyes selected from disazo compounds and trisazo compounds, the compounds represented by the general formula (L), and the compounds selected from the group of compounds represented by the general formulae (A1) to (A3) and the general formulae (B1) to (B3) at the same time and more preferably contains three or four or more dichroic dyes selected from disazo compounds and trisazo compounds, the compounds represented by the general formula (i), and the compounds selected from the group of compounds represented by the general formulae (A1) to (A3) and the general formulae (B1) to (B3) at the same time.

The lower limit of the preferred total content of the compounds represented by the general formula (L) and the general formula (N) relative to the total amount of the host liquid crystal composition is 80%, 85%, 88%, 90%, 92%, 93%, 94%, 95%, 96%, 97%, 98%, 99%, or 100%. The upper limit of the preferred content is 100%, 99%, 98%, or 95%.

The lower limit of the preferred total content of the compounds represented by the general formula (L), the general formulae (A1) to (A3), and the general formulae (B1) to (B3) relative to the total amount of the host liquid crystal composition is 80%, 85%, 88%, 90%, 92%, 93%, 94%, 95%, 96%, 97%, 98%, 99%, or 100%. The upper limit of the preferred content is 100%, 99%, 98%, or 95%.

The lower limit of the preferred total content of the compounds represented by the general formula (L), the general formulae (A1a) to (A3c), and the general formulae (B1a) to (B2c) relative to the total amount of the host liquid crystal composition is 80%, 85%, 88%, 90%, 92%, 93%, 94%, 95%, 96%, 97%, 98%, 99%, or 100%. The upper limit of the preferred content is 100%, 99%, 98%, or 95%.

The composition according to the present invention preferably does not contain compounds intramolecularly having a structure in which hetero atoms such as oxygen atoms bond to each other, e.g., a peroxide (—CO—OO—) structure.

When an importance is given to the reliability and long-term stability of the composition, the content of a compound having a carbonyl group is preferably 5% or less, more preferably 3% or less, further preferably 1% or less, and most preferably substantially zero relative to the total mass of the composition.

When an importance is given to the stability against UV irradiation, the content of a compound subjected to substitution with a chlorine atom is preferably 15% or less, more preferably 10% or less, more preferably 8% or less, more preferably 5% or less, more preferably 3% or less, and more preferably substantially zero relative to the total mass of the composition.

The content of a compound in which all ring structures in a molecule are six-membered rings is preferably increased. The content of the compound in which all ring structures in a molecule are six-membered rings is preferably 80% or more, more preferably 90% or more, and further preferably 95% or more relative to the total mass of the composition. Most preferably, the composition is substantially constituted by only the compound in which all ring structures in a molecule are six-membered rings.

To suppress the deterioration of the composition due to oxidation, the content of a compound having a cyclohexenylene group as a ring structure is preferably decreased. The content of the compound having a cyclohexenylene group is preferably 10% or less, more preferably 8% or less, more preferably 5% or less, more preferably 3% or less, and more preferably substantially zero relative to the total mass of the composition.

When an importance is given to improvements in viscosity and Tni, the content of a compound intramolecularly having a 2-methylbenzene-1,4-diyl group whose hydrogen atoms may be substituted with halogens is preferably decreased. The content of the compound intramolecularly having the 2-methylbenzene-1,4-diyl group is preferably 10% or less, more preferably 8% or less, more preferably 5% or less, more preferably 3% or less, and more preferably substantially zero relative to the total mass of the composition.

In this description, substantially zero means that the substance is not contained but for the one contained unintentionally.

In the case where the compound contained in the composition according to the present invention has an alkenyl group as a side chain, the number of carbon atoms in the alkenyl group is preferably 2 to 5 when the alkenyl group bonds to cyclohexane and 4 or 5 when the alkenyl group bonds to benzene. The unsaturated bond of the alkenyl group preferably does not directly bond to benzene.

To improve the stability of the liquid crystal composition according to the present invention, stabilizers such as antioxidants, ultraviolet (UV) absorbers, light stabilizers, and infrared absorbers are preferably added. Examples of the antioxidants include hydroquinone derivatives, nitrosamine polymerization inhibitors, and hindered phenol antioxidants. Specific examples of the antioxidants include tert-butylhydroquinone, methylhydroquinone, "Q-1300" and "Q-1301" manufactured by Wako Pure Chemical Industries, Ltd., and "IRGANOX 1010", "IRGANOX 1035", "IRGANOX 1076", "IRGANOX 1098", "IRGANOX 1135", "IRGANOX 1330", "IRGANOX 1425", "IRGANOX 1520", "IRGANOX 1726", "IRGANOX 245", "IRGANOX 259", "IRGANOX 3114", "IRGANOX 3790", "IRGANOX 5057", and "IRGANOX 565" manufactured by BASF.

The UV absorber preferably has excellent absorption performance of ultraviolet rays having a wavelength of 370 nm or less and preferably has little absorption for visible light having a wavelength of 400 nm or more from the viewpoint of good liquid crystal display properties. Specific examples of the UV absorber include hindered phenol compounds, hydroxybenzophenone compounds, benzotriazole compounds, salicylic acid ester compounds, benzophenone compounds, cyanoacrylate compounds, nickel complex salt compounds, and triazine compounds. Examples of the hindered phenol compounds include 2,6-di-tert-butyl-p-cresol, pentaerythrityl-tetrakis[3-(3,5-di-tert-butyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, and tris-(3,5-di-tert-butyl-4-hydroxybenzyl)-isocyanurate. Examples of the benzotriazole compounds include 2-(2'-hydroxy-5'-methylphenyl)benzotriazole, 2,2-methylenebis(4-(1,1,3,3-tetramethylbutyl)-6-(2H-benzotriazol-2-yl)phenol), (2,4-bis-(n-octylthio)-6-(4-hydroxy-3,5-di-tert-butylanilino)-1,3,5-triazine, triethylene glycol bis[3-(3-tert-butyl-5-methyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2-(2'-hydroxy-3',5'-di-tert-butylphenyl)-5-chlorobenzotriazole, (2-(2'-hydroxy-3',5'-di-tert-amylphenyl)-5-chlorobenzotriazole, 2,6-di-tert-butyl-p-cresol, and pentaerythrityl-tetrakis[3-(3,5-di-tert-butyl-4-hydroxyphenyl)propionate]. TINUVIN 109, TINUVIN 171, TINUVIN 326, TINUVIN 327, TINUVIN 328, TINUVIN 770, TINUVIN 900, and TINUVIN 928 manufactured by BASF Japan and KEMISORB 71, KEMISORB 73, and KEMISORB 74 manufactured by CHEMIPRO KASEI KAISHA Ltd. can also be preferably used.

The amount of the stabilizer added to the polymerizable liquid crystal composition is preferably 0.01 to 2.0 mass %, more preferably 0.05 to 1.0 mass %, more preferably 0.05 to 0.5 mass %, more preferably 0.1 to 1.0 mass %, and more preferably 0.1 to 0.5 mass %.

The liquid crystal composition according to the present invention may contain, in addition to the above-described compounds, a compound selected from typical nematic liquid crystal compounds, smectic liquid crystal compounds, cholesteric liquid crystal compounds, chiral agents, and polymerizable compounds.

The liquid crystal composition according to the present invention may contain, as a chiral agent that induces the pitch, a compound having an asymmetric atom, a compound having axial chirality, or a mixture thereof. The chiral agent that induces the pitch is preferably a compound having an asymmetric carbon atom and preferably has a molecular structure including one or two or more 1,4-phenylene groups (one or two hydrogen atoms in this group may be substituted with fluorine, methyl groups, or methoxy groups). To improve or adjust the temperature dependence of the pitch, a plurality of types of chiral agents may be used as a mixture.

The liquid crystal composition according to the present invention may contain a polymerizable compound used for, for example, PS, PSA, and PSVA liquid crystal display devices. The polymerizable compound is preferably, for example, a polymerizable compound constituted by two or three 1,4-phenylene groups, and the polymerizable group is preferably an acrylate or a methacrylate. Specifically, the liquid crystal composition may appropriately contain polymerizable compounds represented by formulae (RM-001) to (RM-007) in an amount of 0 mass % to 5 mass %.

[Chem. 35]

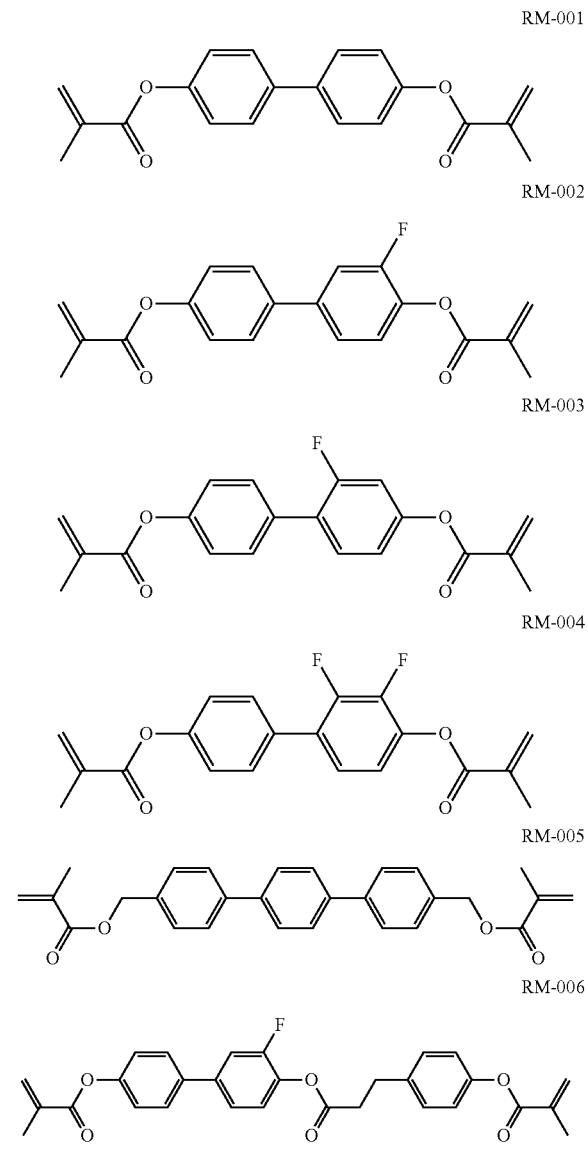

RM-007

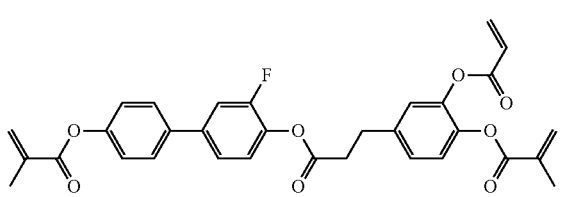

The liquid crystal composition may appropriately contain polymerizable compounds in an amount of 0 mass % to 5 mass %.

Any of hydrogen atoms or fluorine atoms of the 1,4-phenylene groups that constitute the molecular structure of the polymerizable compound may be substituted with fluorine atoms, methyl groups, or methoxy groups. The polymerizable compound used in the present invention may contain an alkylene group, which is generally called a spacer, between the ring and the polymerizable group as in the case of RM-005. The alkylene group preferably has 1 to 10 carbon atoms.

When the liquid crystal composition according to the present invention contains the polymerizable compound in an amount of 1 mass % to 5 mass %, the spacer is preferably an alkylene group having 1 to 6 carbon atoms. More preferably, a plurality of polymerizable compounds are combined with each other from the viewpoint of improving the solubility. When the liquid crystal composition according to the present invention contains the polymerizable compound in an amount of 0.1 mass % to 1 mass %, one or two or more of the polymerizable compounds represented by the formulae (RM-001) to (RM-007) are preferably contained.

The liquid crystal composition according to the present invention is a nematic liquid crystal composition having a positive or negative dielectric anisotropy ($\Delta\varepsilon$). When the liquid crystal composition has a negative dielectric anisotropy, the dielectric anisotropy ($\Delta\varepsilon$) at 25° C. is −2.0 to −6.0 and is more preferably −2.0 to −5.0 and particularly preferably −2.5 to −5.0.

When the liquid crystal composition according to the present invention has a positive dielectric anisotropy, the dielectric anisotropy ($\Delta\varepsilon$) at 25° C. is 2.0 to 20.0 and is preferably 2.0 to 15.0, more preferably 2.0 to 10.0, and particularly preferably 2.0 to 9.0.

The birefringent anisotropy ($\Delta n$) at 25° C. of the liquid crystal composition according to the present invention is 0.070 to 0.200 and is more preferably 0.09 to 0.13 and particularly preferably 0.09 to 0.12.

The viscosity ($\eta$) at 20° C. of the liquid crystal composition according to the present invention is 10 to 100 mPa·s and is preferably 10 to 90 mPa·s, more preferably 10 to 80 mPa·s, more preferably 10 to 70 mPa·s, more preferably 10 to 60 mPa·s, more preferably 10 to 50 mPa·s, more preferably 10 to 40 mPa·s, and particularly preferably 10 to 30 mPa·s.

The rotational viscosity ($\gamma_1$) at 25° C. of the liquid crystal composition according to the present invention is 40 to 250 mPa·s and is preferably 40 to 200 mPa·s, more preferably 40 to 160 mPa·s, more preferably 40 to 140 mPa·s, more preferably 40 to 140 mPa·s, more preferably 40 to 130 mPa·s, more preferably 40 to 125 mPa·s, more preferably 40 to 120 mPa·s, more preferably 40 to 115 mPa·s, more preferably 40 to 110 mPa·s, and particularly preferably 40 to 100 mPa·s.

The nematic phase-isotropic liquid phase transition temperature ($T_{ni}$) of the liquid crystal composition according to the present invention is preferably 80° C. or higher, more preferably 90° C. or higher, more preferably 100° C. or higher, more preferably 110° C. or higher, and more preferably 120° C. or higher, but is particularly preferably adjusted to 90° C. to 115° C.

The liquid crystal composition according to the present invention exhibits a black color and has an unprecedentedly high solubility with dichroic dyes. Therefore, precipitation at a low temperature of 25° C. or −20° C. or lower does not occur or is reduced, and thus the liquid crystal composition can be used in a wide temperature range. Accordingly, the liquid crystal composition is easily applicable to, for example, onboard display devices required to have adaptability to severe environments, portable terminals such as smartphones and tablet computers, and light-controlling devices for windowpanes. The liquid crystal composition has high light resistance, high UV resistance, or high thermal resistance and has no or less change in tinge.

The device that uses the liquid crystal composition according to the present invention has a good tinge of black. Therefore, a sharp metallic black having a feeling of transparency is achieved unlike dull black in the related art, and thus high contrast is achieved. Furthermore, trouble such as being inoperable at low temperature in the related art does not arise or is suppressed. The device has high light resistance, high UV resistance, or high thermal resistance and has no or less change in tinge.

When the liquid crystal composition according to the present invention is a liquid crystal composition having a negative dielectric anisotropy, the liquid crystal display device is preferably an APL (antiparallel) and VA (vertical alignment) liquid crystal display device. To achieve high contrast, the alignment axis is preferably twisted by 90° and more preferably twisted by 240°. To achieve higher contrast, the alignment axis is preferably twisted by 250°, 260°, or 270° and is also preferably twisted by 360°, though such twisting is technically more difficult.

When the liquid crystal composition is a liquid crystal composition having a negative dielectric anisotropy, the pretilt angle is preferably 80° to 90°.

When the liquid crystal composition according to the present invention is a liquid crystal composition having a positive dielectric anisotropy, the liquid crystal display device is preferably a so-called TN or STN liquid crystal display device. To achieve high contrast, the alignment axis is preferably twisted by 180° and more preferably twisted by 240°, 250°, 260°, 270°, or 360° or more.

When the liquid crystal composition is a liquid crystal composition having a positive dielectric anisotropy, the pretilt angle is preferably 1° to 15°.

The liquid crystal composition according to the present invention can be used for liquid crystal display devices or light-controlling devices.

The liquid crystal display device that uses the liquid crystal composition according to the present invention is useful as an active matrix driving liquid crystal display device and can be used for PSA mode, PSVA mode, VA mode, PS-IPS mode, TN mode, STN mode, IPS mode, or PS-FFS mode liquid crystal display devices.

Two substrates of a liquid crystal cell used in the device may be made of glass or a flexible transparent material such as a plastic material. One of the substrates may be made of an opaque material such as silicon. A transparent substrate including a transparent electrode layer can be obtained by, for example, performing sputtering of indium tin oxide (ITO) on a transparent substrate such as a glass plate. To improve the contrast of the device, a substrate subjected to antiglare treatment such as AR coating is preferably used.

A color filter can be produced by, for example, a pigment dispersion method, a printing method, an electrodeposition method, or a staining method. A method for producing a color filter will be described by taking the pigment dispersion method as an example. A curable coloring composition for color filters is applied onto the above-described transparent substrate and patterned. The curable coloring composition is then cured by heating or light irradiation. This process is performed for each of three colors of red, green, and blue. Thus, pixel portions of the color filter can be formed. Furthermore, pixel electrodes each including an active element such as a TFT, a thin-film diode, or a metal-insulator-metal resistivity element may be disposed on the substrate.

The substrates are arranged so as to face each other such that the transparent electrode layer is disposed inside. Herein, the gap between the substrates may be adjusted with a spacer disposed therebetween. The gap is preferably adjusted such that the thickness of a light-controlling layer is 1 to 100 μm. The gap is more preferably adjusted such that the thickness of the light-controlling layer is 1.5 to 10 μm. When a polarizing plate is used, it is preferable to adjust the product of the refractive index anisotropy Δn of the liquid crystal and a cell thickness d so that the maximum contrast is achieved.

When the liquid crystal composition contains a chiral agent, the twist pitch (p) of the liquid crystal composition is preferably 2 μm to 20 μm. More specifically, the twist pitch (p) is appropriately adjusted in accordance with the mode of the liquid crystal display device, such as a TN mode or an STN mode.

When the liquid crystal composition contains a chiral agent, the d/p value that indicates the relationship between the twist pitch (p) and the cell thickness d is preferably 0.5 to 2.2. Specifically, the d/p value that indicates the relationship between the twist pitch (p) and the cell thickness (d) is adjusted to an optimum value in accordance with the twist angle. The optimum d/p value is in a range in which alignment defects such as reverse twist domains and stripe domains are not generated. For example, in the case of 240° twist, the optimum d/p value is in the range of 0.45 to 0.66. The d/p value is preferably adjusted by observing domains through visual inspection or with a microscope so that alignment defects are not generated.

When two polarizing plates are used, the polarizing axis of each of the polarizing plates can be adjusted so that a satisfactory viewing angle and a satisfactory contrast are achieved. Furthermore, a retardation film for widening the viewing angle can also be used. Examples of the spacer include glass particles, plastic particles, alumina particles, and a photoresist material. Subsequently, a sealant such as an epoxy thermosetting composition is applied onto the substrates by screen printing while a liquid-crystal injection port is formed. The substrates are bonded to each other, and the sealant is thermally cured by heating.

The method for interposing the liquid crystal composition between the two substrates may be, for example, a commonly used vacuum injection method or an ODF method.

In the device according to the present invention, for example, films that block light having a wavelength of 400 nm or less and serve as an ultraviolet blocking film may be stacked on the liquid crystal cell.

The device according to the present invention may be constituted by a single liquid crystal cell or may be constituted by two or three or more liquid crystal cells in a stacked manner. When a plurality of cells are used in a stacked manner, vertically aligned cells subjected to antiparallel alignment are preferably stacked orthogonally from the viewpoint of improving the contrast.

EXAMPLES

Hereafter, the present invention will be further described in detail based on Examples, but the present invention is not limited to Examples. In compositions of Examples and Comparative Examples below, "%" means "mass %".

In Examples, the following abbreviations are used to describe liquid crystal compounds.
(Ring Structure)

[Chem. 36]

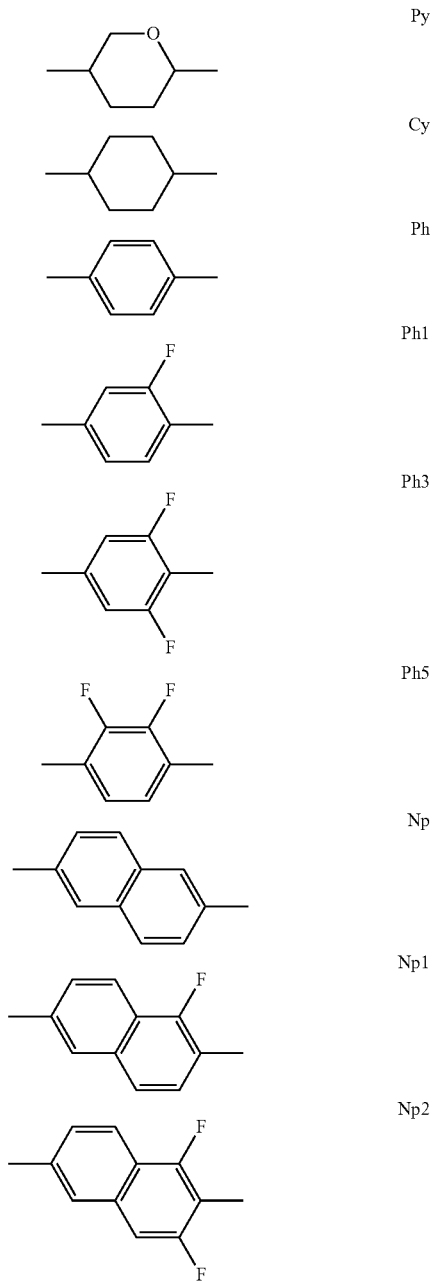

-continued

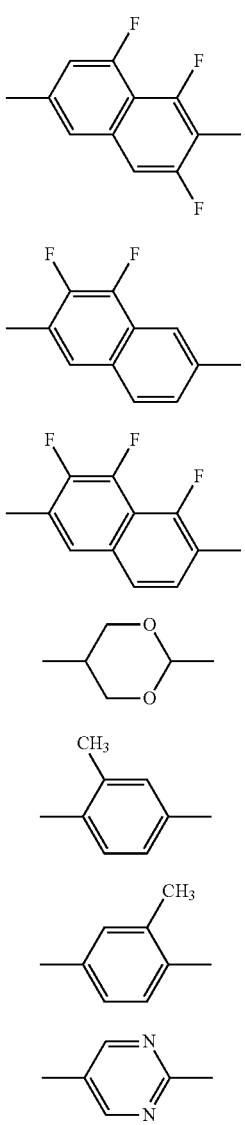

(Side Chain Structure and Linking Structure)

TABLE 1

| Expression in formula | Substituent and Linking group |
|---|---|
| 1- | $CH_3$— |
| 2- | $C_2H_5$— |
| 3- | $n\text{-}C_3H_7$— |
| 4- | $n\text{-}C_4H_9$— |
| 5- | $n\text{-}C_5H_{11}$— |
| V— | $CH_2$=CH— |
| V2— | $CH_2$=CH—$CH_2$—$CH_2$— |
| 1V2— | $CH_3$—CH=CH—$CH_2$—$CH_2$— |
| -1 | —$CH_3$ |
| -2 | —$C_2H_5$ |
| -3 | -n-$C_3H_7$ |
| —O2 | —$OC_2H_5$ |
| —V0 | —CH=$CH_2$ |
| —V1 | —CH=CH—$CH_3$ |
| —2V | —$CH_2$—$CH_2$—CH=$CH_2$ |
| —F | —F |
| —OCF3 | —$OCF_3$ |
| —CN | —CN |
| — | single bond |

TABLE 1-continued

| Expression in formula | Substituent and Linking group |
|---|---|
| -E- | —COO— |
| —CH2CH2— | —$CH_2CH_2$— |
| —CFFO— | —$CF_2O$— |
| -T- | —C≡C— |
| —O1— | —$OCH_2$— |
| —1O— | —$CH_2O$— |

In Examples, the measured properties are as follows.

$T_{ni}$: nematic phase-isotropic liquid phase transition temperature (° C.)

This was measured with a Nikon polarizing microscope using a hot stage manufactured by Mettler Toledo International Inc.

Δn: refractive index anisotropy at 25° C.

This was measured with an Abbe refractometer.

Δε: dielectric anisotropy at 25° C.

This was measured with an LCR meter manufactured by Agilent.

η: bulk flow viscosity [mPa·s] (20° C.)

This was measured with an E-type viscometer.

Solubility: About 0.5 g of a liquid crystal composition was inserted into a test tube. The test tube was degassed, purged with nitrogen, and then capped and was stored in a thermostat oven. After 240 hours, the presence or absence of precipitation was visually observed. When precipitation was not observed, "Good" was given. When precipitation was observed, "Poor" was given. The storage temperature was −25° C., −15° C., and 0° C.

Chromaticity: The chromaticity is a chromaticity of light obtained by passing light of the standard illuminant D65 through a test panel (cell thickness 10 μm) into which the liquid crystal composition has been injected. Conversion to a chromaticity in the standard illuminant D65 was performed using a spectrum of an LED light source and a spectrum of GH-LCD transmitted light obtained with a DMS-501 spectrometer, and the chromaticity was expressed using the CIE 1931 xy coordinates.

Transmittance (off): This is a transmittance (%) measured at an applied voltage of 0 (V) when the electro-optic properties of a test panel into which the liquid crystal composition was injected were evaluated at 25° C. using a white LED light source (DMS-501 manufactured by autronic).

Transmittance (on): This is a transmittance (%) measured at an applied voltage of 810 (V) when the electro-optic properties of a test panel into which the liquid crystal composition was injected were evaluated at 25° C. using a white LED light source (DMS-501 manufactured by autronic).

Pitch: A reference material having a known pitch and a sample were injected into a wedge-shaped cell. The pitch was calculated from the angle θ of the wedge-shaped cell determined from the reference material and the distance between disclination lines.

Comparative Example 1, Comparative Example 2, Example 1, and Example 2

Liquid crystal compositions in Comparative Example 1, Comparative Example 2, Example 1, and Example 2 shown in Table below were prepared using a disazo compound (4-[4-{4-(4-ethlybenzeyloxy)phenylazo}-2-methylphenylazo]-4'-ethoxycarbonylbiphenyl) that serves as an azo dye (A) and exhibits a color of yellow, a trisazo compound (4-N,N-diethylamino-4'-[4-(3,5,5-trimethiylhexyloxy)phenylazo}phenylazo]azobenzene) that serves as an azo dye (B) and exhibits a color of red, a trisazo compound (4-[4{4-(1-heptyl-2,2,4,7-tetramethyl-1,2,3,4-tetrahydroquinolin-6-ylazo)napthalen-1-ylazo}napthalen-1-ylazo]benzoic acid 4-pentylphenyl ester) that serves as an azo dye (C) and exhibits a color of blue, and anthraquinone that serves as a dye for comparison. The physical properties and characteristics of the liquid crystal compositions were measured. The azo dye (A) had a maximum absorption wavelength of 402 nm, the azo dye (B) had a maximum absorption wavelength of 522 nm, and the azo dye (C) had a maximum absorption wavelength of 636 nm. The maximum absorption wavelength of a dichroic dye was determined from the absorbance obtained by adding 0.5% of each dichroic dye to 100% of a reference material (RD-001), injecting the resulting mixture into an antiparallel cell having a cell thickness of 10 μm, and performing measurement using a spectrometer (DMS-501).

The proportions in the liquid crystal compositions in Table are expressed in units of "part by mass". Furthermore, vertical alignment liquid crystal cells having a cell thickness d of 10 μm for test panels were produced using the liquid crystal compositions. Table 2 shows the combined components of each liquid crystal composition, the physical properties and characteristics of the liquid crystal compositions, and the test results. Note that $\Delta n$, $\Delta \varepsilon$, and $\eta$ are physical properties of host liquid crystal (HLC).

TABLE 2

| | | Comparative Example 1 | Example 1 | Comparative Example 2 | Example 2 | Example 3 | Example 4 | Example 5 |
|---|---|---|---|---|---|---|---|---|
| HLC | 3-Cy-Cy-2 | 14 | 14 | 14 | 14 | 14 | 14 | 14 |
| | 3-Cy-Cy-4 | 5 | 5 | 5 | 5 | 5 | 5 | 5 |
| | 3-Cy-Ph-O2 | 9.7 | 9.7 | 9.7 | 9.7 | 9.7 | 9.7 | 9.7 |
| | V-Cy-Cy-Ph-1 | 8 | 8 | 8 | 8 | 8 | 8 | 8 |
| | V2-Cy-Cy-Ph-1 | 12 | 12 | 12 | 12 | 12 | 12 | 12 |
| | 3-Cy-E-Ph5-O2 | — | — | 5 | 5 | 5 | 5 | 5 |
| | 3-Cy-1O-Ph5-O1 | 5 | 5 | 5 | 5 | 5 | 5 | 5 |
| | 3-Cy-1O-Ph5-O2 | 7 | 7 | 7 | 7 | 7 | 7 | 7 |
| | 2-Cy-Cy-1O-Ph5-O2 | 15 | 15 | 12 | 12 | 12 | 12 | 12 |
| | 3-Cy-Cy-1O-Ph5-O2 | 12 | 12 | 12 | 12 | 12 | 12 | 12 |
| | V-Cy-Cy-1O-Ph5-O2 | 6 | 6 | 5 | 5 | 5 | 5 | 5 |
| | V-Cy-Cy-1O-Ph5-O3 | 6 | 6 | 5 | 5 | 5 | 5 | 5 |
| | kemisorb 71 | 0.2 | 0.2 | 0.2 | 0.2 | 0.2 | 0.2 | 0.2 |
| | irganox 1076 | 0.1 | 0.1 | 0.1 | 0.1 | 0.1 | 0.1 | 0.1 |
| Anthraquinone | | 1.43 | — | 1.43 | — | — | — | — |
| Azo dye (compound A) | | 0.86 | 0.86 | 0.86 | 0.86 | 0.36 | 0.18 | 0.18 |
| Azo dye (compound B) | | 0.52 | 0.52 | 0.52 | 0.52 | 0.25 | 0.42 | 0.31 |
| Azo dye (compound C) | | — | 1.43 | — | 1.43 | 0.19 | 0.18 | 0.31 |
| Chiral S-811 | | — | — | — | — | — | — | — |
| TOTAL | | 102.81 | 102.81 | 102.81 | 102.81 | 100.8 | 100.78 | 100.8 |
| $T_{ni}$ [° C.] | | 94.8 | 94.8 | 97.3 | 97.3 | 97.3 | 97.3 | 97.3 |
| $\Delta n$ (HLC) | | 0.084 | 0.084 | 0.085 | 0.085 | 0.085 | 0.085 | 0.085 |
| $\Delta \varepsilon$ (HLC) | | -3.9 | -3.9 | -3.9 | -3.9 | -3.9 | -3.9 | -3.9 |
| $\eta$ (HLC) [mPa·s] | | 21.7 | 21.7 | 21.7 | 21.7 | 21.7 | 21.7 | 21.7 |
| Cell thickness d [μm] | | — | 10.0 | — | 10.0 | 10.0 | 10.0 | 10.0 |
| Pitch p [μm] | | — | — | — | — | — | — | — |
| Twist angle [°] | | — | 0 | — | 0 | 0 | 0 | 0 |
| Number of cells [single layer or two layers] | | — | Single layer | — | Single layer | Single layer | Single layer | Single layer |
| AR coating [Yes or No] | | — | No | — | No | No | No | No |
| Solubility 10 days [-25° C.] | | Poor | Poor | Poor | Good | Good | Good | Good |
| Solubility 10 days [-15° C.] | | Poor | Good | Poor | Good | Good | Good | Good |

TABLE 2-continued

|  | Comparative Example 1 | Example 1 | Comparative Example 2 | Example 2 | Example 3 | Example 4 | Example 5 |
|---|---|---|---|---|---|---|---|
| Solubility 10 days [0° C.] | Poor | Good | Poor | Good | Good | Good | Good |
| Chromaticity x (D65 illuminant) | — | 0.316 | — | 0.316 | 0.345 | 0.347 | 0.334 |
| Chromaticity y (D65 illuminant) | — | 0.336 | — | 0.336 | 0.344 | 0.332 | 0.332 |
| off transmittance | — | 61.0 | — | 61.2 | — | — | — |
| on transmittance | — | 31.5 | — | 31.7 | — | — | — |
| [off transmittance] − [on transmittance] | — | 29.5 | — | 29.5 | — | — | — |

As is clear from Examples 1 and 2 and Comparative Examples 1 and 2, the azo dye had a higher solubility in a host liquid crystal composition than anthraquinone. When the composition contained a compound having a negative dielectric anisotropy and corresponding to the general formula (N-i), $T_{ni}$ was increased without affecting the viscosity, the dielectric anisotropy, and the refractive index anisotropy. Furthermore, when the composition contained the compound corresponding to the general formula (N-i), the low-temperature storage stability was improved.

Examples 6 to 10

Liquid crystal compositions in Examples 6 to 10 shown in Table below were prepared, and the physical properties and characteristics of the liquid crystal compositions were measured. The proportions in the liquid crystal compositions in Table are expressed in units of "part by mass". Furthermore, vertical alignment liquid crystal cells having a cell thickness d of 10 µm for test panels were produced using the liquid crystal compositions. Table 3 shows the combined components of each liquid crystal composition, the physical properties and characteristics of the liquid crystal compositions, and the test results. Note that Δn, Δε, and η are physical properties of host liquid crystal (HLC).

TABLE 3

|  |  | Example 6 | Example 7 | Example 8 | Example 9 | Example 10 |
|---|---|---|---|---|---|---|
| HLC | 3-Cy-Cy-2 | 14 | 14 | 14 | 14 | 14 |
|  | 3-Cy-Cy-4 | 5 | 5 | 5 | 5 | 5 |
|  | 3-Cy-Ph-O2 | 10 | 9.7 | 9.7 | 10 | 9.7 |
|  | V-Cy-Cy-Ph-1 | 8 | 8 | 8 | 8 | 8 |
|  | V2-Cy-Cy-Ph-1 | 12 | 12 | 12 | 12 | 12 |
|  | 3-Cy-E-Ph5-O2 | 5 | 5 | 5 | 5 | 5 |
|  | 3-Cy-1O-Ph5-O1 | 5 | 5 | 5 | 5 | 5 |
|  | 3-Cy-1O-Ph5-O2 | 7 | 7 | 7 | 7 | 7 |
|  | 2-Cy-Cy-1O-Ph5-O2 | 12 | 12 | 12 | 12 | 12 |
|  | 3-Cy-Cy-1O-Ph5-O2 | 12 | 12 | 12 | 12 | 12 |
|  | V-Cy-Cy-1O-Ph5-O2 | 5 | 5 | 5 | 5 | 5 |
|  | V-Cy-Cy-1O-Ph5-O3 | 5 | 5 | 5 | 5 | 5 |
|  | kemisorb 71 | — | 0.2 | 0.2 | — | 0.2 |
|  | irganox 1076 | — | 0.1 | 0.1 | — | 0.1 |
| Anthraquinone |  | — | — | — | — | — |
| Azo dye (compound A) |  | 0.86 | 0.86 | 0.86 | 0.86 | 1.07 |
| Azo dye (compound B) |  | 0.52 | 0.52 | 0.52 | 0.52 | 0.65 |
| Azo dye (compound C) |  | 1.43 | 1.43 | 1.43 | 1.43 | 1.78 |
| Chiral S-811 |  | — | 0.63 | 0.8 | 0.8 | — |
| TOTAL |  | 102.81 | 103.44 | 103.61 | 103.61 | 103.5 |
| $T_{ni}$ [° C.] |  | 97.3 | 97.3 | 97.3 | 97.3 | 97.3 |
| Δn (HLC) |  | 0.085 | 0.085 | 0.085 | 0.085 | 0.085 |
| Δε (HLC) |  | −3.9 | −3.9 | −3.9 | −3.9 | −3.9 |
| η (HLC) [mPa·s] |  | 21.7 | 21.7 | 21.7 | 21.7 | 21.7 |
| Cell thickness d [µm] |  | 10.0 | 10.0 | 10.0 | 10.0 | 10.0 |
| Pitch p [µm] |  | — | 15.9 | 12.6 | 12.6 | — |
| Twist angle [°] |  | 0 | 240 | 360 | 360 | 0 |
| Number of cells [single layer or two layers] |  | Single layer | Single layer | Single layer | Single layer | Single layer |
| AR coating [Yes or No] |  | No | No | No | No | No |
| Solubility 10 days [−25° C.] |  | Good | Good | Good | Good | Good |
| Solubility 10 days [−15° C.] |  | Good | Good | Good | Good | Good |
| Solubility 10 days [0° C.] |  | Good | Good | Good | Good | Good |

TABLE 3-continued

|  | Example 6 | Example 7 | Example 8 | Example 9 | Example 10 |
|---|---|---|---|---|---|
| Chromaticity x (D65 illuminant) | 0.316 | 0.316 | 0.316 | 0.316 | 0.316 |
| Chromaticity y (D65 illuminant) | 0.336 | 0.336 | 0.336 | 0.336 | 0.336 |
| off transmittance | 61.3 | 63.0 | 62.0 | 62.0 | 55.4 |
| on transmittance | 31.7 | 24.0 | 19.0 | 19.0 | 15.4 |
| [off transmittance] − [on transmittance] | 29.6 | 39.0 | 43.0 | 43.0 | 40.0 |

The results in Examples 2, 7, and 8 and the results in Examples 6 and 9 showed that the addition of the chiral agent increased the value of [off transmittance]−[on transmittance], which improved the contrast. It was also found that compared with liquid crystal cells subjected to antiparallel alignment (Examples 2 and 6), the value of [off transmittance]−[on transmittance] increased as the twist angle was increased to 240° (Example 7) and further 360° (Examples 8 and 9), which improved the contrast. As is clear from Example 10, the liquid crystal composition according to the present invention has high solubility even if the azo dye content is increased, and thus the contrast can be improved.

Examples 11 to 15

Liquid crystal compositions in Examples 11 to 15 shown in Table below were prepared, and the physical properties and characteristics of the liquid crystal compositions were measured. The proportions in the liquid crystal compositions in Table are expressed in units of "part by mass". Furthermore, vertical alignment liquid crystal cells having a cell thickness d of 10 μm or 5 μm for test panels were produced using the liquid crystal compositions. In Examples 11, 14, and 15, the two produced liquid crystal cells were stacked such that the alignment axes of the cells were orthogonal to each other. Thus, liquid crystal cells for test panels were produced. In Examples 13 and 15, a substrate subjected to AR coating was used. Table 4 shows the combined components of each liquid crystal composition, the physical properties and characteristics of the liquid crystal compositions, and the test results. Note that Δn, Δε, and η are physical properties of host liquid crystal (HLC).

TABLE 4

|  |  | Example 11 | Example 12 | Example 13 | Example 14 | Example 15 |
|---|---|---|---|---|---|---|
| HLC | 3-Cy-Cy-2 | 14 | 14 | 14 | 14 | 14 |
|  | 3-Cy-Cy-4 | 5 | 5 | 5 | 5 | 5 |
|  | 3-Cy-Ph-O2 | 9.7 | 9.7 | 9.7 | 9.7 | 9.7 |
|  | V-Cy-Cy-Ph-1 | 8 | 8 | 8 | 8 | 8 |
|  | V2-Cy-Cy-Ph-1 | 12 | 12 | 12 | 12 | 12 |
|  | 3-Cy-E-Ph5-O2 | 5 | 5 | 5 | 5 | 5 |
|  | 3-Cy-1O-Ph5-O1 | 5 | 5 | 5 | 5 | 5 |
|  | 3-Cy-1O-Ph5-O2 | 7 | 7 | 7 | 7 | 7 |
|  | 2-Cy-Cy-1O-Ph5-O2 | 12 | 12 | 12 | 12 | 12 |
|  | 3-Cy-Cy-1O-Ph5-O2 | 12 | 12 | 12 | 12 | 12 |
|  | V-Cy-Cy-1O-Ph5-O2 | 5 | 5 | 5 | 5 | 5 |
|  | V-Cy-Cy-1O-Ph5-O3 | 5 | 5 | 5 | 5 | 5 |
|  | kemisorb 71 | 0.2 | 0.2 | 0.2 | 0.2 | 0.2 |
|  | irganox 1076 | 0.1 | 0.1 | 0.1 | 0.1 | 0.1 |
| Anthraquinone |  | — | — | — | — | — |
| Azo dye (compound A) |  | 0.86 | 0.86 | 0.86 | 0.86 | 0.86 |
| Azo dye (compound B) |  | 0.52 | 0.52 | 0.52 | 0.52 | 0.52 |
| Azo dye (compound C) |  | 1.43 | 1.43 | 1.43 | 1.43 | 1.43 |
| Chiral S-811 |  | — | 1.6 | 1.6 | — | — |
| TOTAL |  | 102.81 | 104.41 | 104.41 | 102.81 | 102.81 |
| $T_{ni}$ [° C.] |  | 97.3 | 97.3 | 97.3 | 97.3 | 97.3 |
| Δn (HLC) |  | 0.085 | 0.085 | 0.085 | 0.085 | 0.085 |
| Δε (HLC) |  | −3.9 | −3.9 | −3.9 | −3.9 | −3.9 |
| η (HLC) [mPa·s] |  | 21.7 | 21.7 | 21.7 | 21.7 | 21.7 |
| Cell thickness d [μm] |  | 10.0 | 5.0 | 5.0 | 5.0 | 5.0 |
| Pitch p [μm] |  | — | 6.3 | 6.3 | — | — |
| Twist angle [°] |  | 0 | 360 | 360 | 0 | 0 |
| Number of cells [single layer or two layers] |  | Two layers | Single layer | Single layer | Two layers | Two layers |
| AR coating [Yes or No] |  | No | No | Yes | No | Yes |
| Solubility 10 days [−25° C.] |  | Good | Good | Good | Good | Good |
| Solubility 10 days [−15° C.] |  | Good | Good | Good | Good | Good |
| Solubility 10 days [0° C.] |  | Good | Good | Good | Good | Good |
| Chromaticity x (D65 illuminant) |  | 0.316 | 0.316 | 0.316 | 0.316 | 0.316 |
| Chromaticity y (D65 illuminant) |  | 0.336 | 0.336 | 0.336 | 0.336 | 0.336 |
| off transmittance |  | 41.0 | 67.0 | 73.0 | 61.3 | 63.8 |
| on transmittance |  | 1.6 | 20.2 | 22.0 | 12.4 | 12.5 |
| [off transmittance] − [on transmittance] |  | 39.4 | 46.8 | 51.0 | 48.9 | 51.3 |

The results in Examples 12 and 13 and the results in Examples 14 and 15 showed that the presence of AR coating improved the contrast. The results in Example 10 and Examples 11, 14, and 15 showed that the on transmittance was lower in the cells having a two-layer structure in which antiparallel cells were disposed in an orthogonal manner than in the cell having a single-layer structure.

Examples 16 to 19

Liquid crystal compositions in Examples 16 to 19 shown in Table below were prepared, and the physical properties and characteristics of the liquid crystal compositions were measured. The proportions in the liquid crystal compositions in Table are expressed in units of "part by mass". Furthermore, vertical alignment liquid crystal cells having a cell thickness d of 10 μm or 5 μm for test panels were produced using the liquid crystal compositions. In Example 19, the two produced liquid crystal cells were stacked such that the alignment axes of the cells were orthogonal to each other. Thus, liquid crystal cells for test panels were produced. In Example 18, a substrate subjected to AR coating was used. Tables 5 and 6 show the combined components of each liquid crystal composition, the physical properties and characteristics of the liquid crystal compositions, and the test results. Note that Δn, Δε, and η are physical properties of host liquid crystal (HLC).

TABLE 5

| | | Example 16 | Example 17 | Example 18 | Example 19 |
|---|---|---|---|---|---|
| HLC | 3-Cy-Cy-2 | 13 | 14 | — | 14 |
| | 3-Cy-Cy-4 | 6 | — | — | 5 |
| | 3-Cy-Cy-5 | 4 | — | — | — |
| | 3-Cy-Cy-V | — | 5 | 19 | — |
| | 3-Cy-Ph—O2 | 6 | 10 | 10 | 9.7 |
| | V-Cy-Cy-Ph-1 | — | 8 | 8 | 8 |
| | V2-Cy-Cy-Ph-1 | — | 12 | 12 | 12 |
| | 3-Cy-E-Ph5—O2 | 5 | 5 | 5 | 5 |
| | 3-Cy-1O—Ph5—O1 | 4 | 5 | 5 | 5 |
| | 3-Cy-1O—Ph5—O2 | 8 | 7 | 7 | 7 |
| | 2-Cy-Cy-1O—Ph5—O2 | 13 | 12 | 12 | 12 |
| | 3-Cy-Cy-1O—Ph5—O2 | 13 | 12 | 12 | 12 |
| | V-Cy-Cy-1O—Ph5—O2 | 6 | 5 | 5 | 5 |
| | V-Cy-Cy-1O—Ph5—O3 | 6 | 5 | 5 | 5 |
| | 3-Cy-Cy-Ph-1 | 6 | — | — | — |
| | 3-Cy-Cy-Ph-3 | 4 | — | — | — |
| | 3-Cy-Ph—Ph-2 | 3 | — | — | — |
| | 5-Cy-Ph—Ph-2 | 3 | — | — | — |
| | kemisorb 71 | — | — | — | 0.2 |
| | irganox 1076 | — | — | — | 0.1 |
| Anthraquinone | | — | — | — | — |
| Azo dye (compound A) | | 0.86 | 0.86 | 0.86 | 0.86 |
| Azo dye (compound B) | | 0.52 | 0.52 | 0.52 | 0.52 |
| Azo dye (compound C) | | 1.43 | 1.43 | 1.43 | 1.43 |
| Chiral S-811 | | 0.65 | — | — | — |
| TOTAL | | 103.46 | 102.81 | 102.81 | 102.81 |

TABLE 6

| | Example 16 | Example 17 | Example 18 | Example 19 |
|---|---|---|---|---|
| $T_{ni}$ [° C.] | 100.6 | 97.3 | 97.3 | 97.3 |
| Δn (HLC) | 0.087 | 0.085 | 0.085 | 0.085 |
| Δε (HLC) | −4.3 | −3.9 | −3.9 | −3.9 |
| η (HLC) [mPa · s] | 24.7 | 21.7 | 21.7 | 21.7 |
| Cell thickness d [μm] | 10.0 | 5.0 | 5.0 | 5.0 |
| Pitch p [μm] | 12.5 | 6.3 | 6.3 | — |
| Twist angle [°] | 360 | 360 | 360 | 0 |
| Number of cells [single layer or two layers] | Single layer | Single layer | Single layer | Two layers |
| AR coating [Yes or No] | No | No | Yes | No |
| Solubility 10 days [−25° C.] | Good | Good | Good | Good |
| Solubility 10 days [−15° C.] | Good | Good | Good | Good |
| Solubility 10 days [0° C.] | Good | Good | Good | Good |
| Chromaticity x (D65 illuminant) | 0.316 | 0.316 | 0.316 | 0.316 |
| Chromaticity y (D65 illuminant) | 0.336 | 0.336 | 0.336 | 0.336 |
| off transmittance | 61.0 | 61.5 | 61.5 | 61.5 |
| on transmittance | 31.6 | 32.0 | 32.0 | 32.0 |
| [off transmittance] − [on transmittance] | 29.4 | 29.5 | 29.5 | 29.5 |

Comparative Example 3 and Examples 20 to 24

Liquid crystal compositions in Comparative Example 3 and Examples 20 to 24 shown in Table below were prepared, and the physical properties and characteristics of the liquid crystal compositions were measured. The proportions in the liquid crystal compositions in Table are expressed in units of "part by mass". Furthermore, an antiparallel cell having a twist angle of 0° and an STN cell having a twist angle of 240°, each of the cells having a cell thickness d of 10 μm or 6 μm and horizontal alignment, were produced using the liquid crystal compositions. Tables 7 and 8 show the combined components of each liquid crystal composition, the physical properties and characteristics of the liquid crystal compositions, and the test results. Note that Δn, Δε, and are physical properties of host liquid crystal (HLC).

TABLE 7

| | | Comparative Example 3 | Example 20 | Example 21 | Example 22 | Example 23 | Example 24 |
|---|---|---|---|---|---|---|---|
| HLC | 3-Cy-Ph3-CN | 12 | 12 | 12 | 12 | 12 | 12 |
| | 5-Ph-E-Ph1-F | 8 | 8 | 8 | 8 | 8 | 8 |
| | 3-Cy-Ph-O2 | 9.7 | 9.7 | 9.7 | 9.7 | 9.7 | 9.7 |
| | 3-Cy-E-Ph-O2 | 5.4 | 5.4 | 5.4 | 5.4 | 5.4 | 5.4 |
| | 4-Cy-E-Ph-O2 | 5.3 | 5.3 | 5.3 | 5.3 | 5.3 | 5.3 |
| | 5-Cy-E-Ph-O1 | 5.3 | 5.3 | 5.3 | 5.3 | 5.3 | 5.3 |
| | V-Cy-Cy-Ph1-F | 15 | 15 | 15 | 15 | 15 | 15 |
| | 3-Cy-2-Cy-E-Ph1-F | 2 | 2 | 2 | 2 | 2 | 2 |
| | 4-Cy-2-Cy-E-Ph1-F | 2 | 2 | 2 | 2 | 2 | 2 |
| | 3-Cy-Cy-E-Ph1-F | 3 | 3 | 3 | 3 | 3 | 3 |
| | V-Cy-Cy-Ph-1 | 10 | 10 | 10 | 10 | 10 | 10 |
| | V2-Cy-Cy-Ph-1 | 12 | 12 | 12 | 12 | 12 | 12 |

TABLE 7-continued

|  | Comparative Example 3 | Example 20 | Example 21 | Example 22 | Example 23 | Example 24 |
|---|---|---|---|---|---|---|
| 2-Cy-Cy-Ph-Ph1-F | 3 | 3 | 3 | 3 | 3 | 3 |
| 3-Cy-Cy-Ph-Ph1-F | 3 | 3 | 3 | 3 | 3 | 3 |
| 3-Cy-Cy-E-Ph-Cy-3 | 2 | 2 | 2 | 2 | 2 | 2 |
| 3-Cy-Cy-E-Ph-Cy-4 | 2 | 2 | 2 | 2 | 2 | 2 |
| kemisorb 71 | 0.2 | 0.2 | 0.2 | 0.2 | 0.2 | 0.2 |
| irganox 1076 | 0.1 | 0.1 | 0.1 | 0.1 | 0.1 | 0.1 |
| Anthraquinone | 1.43 | — | — | — | — | — |
| Azo dye (compound A) | 0.86 | 0.86 | 0.86 | 0.36 | 0.18 | 0.18 |
| Azo dye (compound B) | 0.52 | 0.52 | 0.52 | 0.25 | 0.42 | 0.31 |
| Azo dye (compound C) | — | 1.43 | 1.43 | 0.19 | 0.18 | 0.31 |
| Chiral S-811 | — | — | 0.75 | — | — | — |
| TOTAL | 102.81 | 102.81 | 103.56 | 100.8 | 100.78 | 100.8 |

TABLE 8

|  | Comparative Example 3 | Example 20 | Example 21 | Example 22 | Example 23 | Example 24 |
|---|---|---|---|---|---|---|
| $T_{ni}$ [° C.] | 95.2 | 95.2 | 95.2 | 95.2 | 95.2 | 95.2 |
| $\Delta n$ (HLC) | 0.0943 | 0.0943 | 0.0943 | 0.0943 | 0.0943 | 0.0943 |
| $\Delta \varepsilon$ (HLC) | 5.5 | 5.5 | 5.5 | 5.5 | 5.5 | 5.5 |
| $\eta$ (HLC) [mPa·s] | 19.9 | 19.9 | 19.9 | 19.9 | 19.9 | 19.9 |
| Cell thickness d [μm] | 10.0 | 10.0 | 6.0 | 10.0 | 10.0 | 10.0 |
| Pitch p [μm] | — | — | 11.7 | — | — | — |
| Twist angle [°] | 0 | 0 | 240 | 0 | 0 | 0 |
| Number of cells [single layer or two layers] | Single layer | Single layer | Single layer | Single layer | Single layer | Single layer |
| AR coating [Yes or No] | No | No | No | No | No | No |
| Solubility 10 days [−25° C.] | Poor | Good | Good | Good | Good | Good |
| Solubility 10 days [−15° C.] | Poor | Good | Good | Good | Good | Good |
| Solubility 10 days [0° C.] | Good | Good | Good | Good | Good | Good |
| Chromaticity x (D65 illuminant) | 0.313 | 0.313 | 0.316 | 0.345 | 0.347 | 0.334 |
| Chromaticity y (D65 illuminant) | 0.335 | 0.335 | 0.335 | 0.344 | 0.332 | 0.332 |
| off transmittance | 28.8 | 28.8 | 28.9 | — | — | — |
| on transmittance | 53.3 | 53.3 | 67.5 | — | — | — |
| [off transmittance] − [on transmittance] | 24.5 | 24.5 | 38.6 | — | — | — |

Examples 25 and 26

Liquid crystal compositions in Examples 25 and 26 shown in Table below were prepared, and the physical properties and characteristics of the liquid crystal compositions were measured. The proportions in the liquid crystal compositions in Table are expressed in units of "part by mass". Furthermore, horizontal alignment liquid crystal cells having a cell thickness d of 10 μm or 6 μm for test panels were produced using the liquid crystal compositions. Tables 9 and 10 show the combined components of each liquid crystal composition, the physical properties and characteristics of the liquid crystal compositions, and the test results. Note that Δn, Δε, and η are physical properties of host liquid crystal (HLC).

TABLE 9

|  |  | Example 25 | Example 26 |
|---|---|---|---|
| HLC | 3-Cy-Ph3—CN | 12 | 12 |
|  | 5-Ph-Ph—CN | 6 | 6 |
|  | 3-Cy-Ph—O2 | 9.7 | 9.7 |
|  | 3-Cy-E-Ph—O2 | 5 | 5 |
|  | 4-Cy-E-Ph—O2 | 5 | 5 |
|  | 5-Cy-E-Ph—O1 | 5 | 5 |
|  | V-Cy-Ph1—F | 20 | 20 |
|  | 3-Cy-2-Cy-E-Ph1—F | 2 | 2 |
|  | 4-Cy-2-Cy-E-Ph1—F | 2 | 2 |
|  | 3-Cy-Cy-E-Ph1—F | 3 | 3 |
|  | V-Cy-Cy-Ph-1 | 11 | 11 |
|  | V2-Cy-Cy-Ph-1 | 13 | 13 |
|  | 2-Cy-Cy-Ph—Ph1—F | 2 | 2 |
|  | 3-Cy-Cy-Ph—Ph1—F | — | — |
|  | 3-Cy-Cy-E-Ph-Cy-3 | 2 | 2 |
|  | 3-Cy-Cy-E-Ph-Cy-4 | 2 | 2 |
|  | kemisorb 71 | 0.2 | 0.2 |
|  | irganox 1076 | 0.1 | 0.1 |
| Anthraquinone |  | — | — |
| Azo dye (compound A) |  | 0.86 | 0.86 |

TABLE 9-continued

|  | Example 25 | Example 26 |
|---|---|---|
| Azo dye (compound B) | 0.52 | 0.52 |
| Azo dye (compound C) | 1.43 | 1.43 |
| Chiral S-811 | — | 0.75 |
| TOTAL | 102.81 | 103.54 |

TABLE 10

|  | Example 25 | Example 26 |
|---|---|---|
| $T_{ni}$ [° C.] | 94.3 | 94.3 |
| Δn (HLC) | 0.1027 | 0.1027 |
| Δε (HLC) | 5.9 | 5.9 |
| η (HLC) [mPa · s] | 19.6 | 19.6 |
| Cell thickness d [μm] | 10 | 10 |
| Pitch p [μm] | — | 11.1 |
| Twist angle [°] | 0 | 240 |
| Number of cells [single layer or two layers] | Single layer | Single layer |
| AR coating [Yes or No] | No | No |
| Solubility 10 days [−25° C.] | Good | Good |
| Solubility 10 days [−15° C.] | Good | Good |
| Solubility 10 days [0° C.] | Good | Good |
| Chromaticity x (D65 illuminant) | 0.314 | 0.317 |
| Chromaticity y (D65 illuminant) | 0.337 | 0.336 |
| off transmittance | 29.1 | 29.6 |
| on transmittance | 54.2 | 67.6 |
| [off transmittance] − [on transmittance] | 25.1 | 38.0 |

Examples 27 and 28

A liquid crystal cell for test panels in Example 27 was produced in the same manner as in Example 2. A liquid crystal cell for test panels in Example 28 was produced in the same manner as in Example 2, except that a substrate to which a film that blocks light having a wavelength of 400 nm or less was attached was used. Subsequently, the voltage holding ratio (VHR) of the liquid crystal cells in Example 27 and Example 28 were measured.

The VHR is a voltage holding ratio (%) that is a ratio of a voltage after UV irradiation with a xenon lamp to the initial applied voltage. The measurement conditions were 5 V, 60 Hz, and 25° C. The UV irradiation was performed at an illuminance of 500 W/m² for irradiation times of 0, 16, 48, 96, and 160 hours while a voltage of 0 V or 10 V was applied.

Table 11 shows the results of VHR (%) in Examples 27 and 28 based on the UV irradiation conditions.

TABLE 11

| | Blocking film | Voltage during irradiation [V] | Irradiation time [h] | | | | |
|---|---|---|---|---|---|---|---|
| | | | 0 h | 16 h | 48 h | 96 h | 160 h |
| Example 27 | No | 0 V | 78.0 | 73.1 | 60.6 | 31.1 | 19.0 |
| | | 10 V | 78.0 | 73.6 | 60.9 | 30.5 | 17.5 |
| Example 28 | Yes | 0 V | 77.5 | 79.2 | 77.5 | 74.6 | 71.2 |
| | | 10 V | 77.9 | 80.4 | 80.2 | 77.1 | 72.6 |

As is clear from Examples 27 and 28, a decrease in the voltage holding ratio after UV irradiation was suppressed in Example 28 in which the blocking film was disposed compared with Example 27, and thus the reliability was improved. The decrease in the voltage holding ratio in Example 28 was more remarkably suppressed as the UV irradiation time was increased.

Accordingly, the liquid crystal composition according to the present invention is a GH liquid crystal composition that satisfies high contrast, high solubility, high nematic-isotropic transition temperature ($T_{NI}$), and low birefringent anisotropy (Δn) effective for high light resistance and high thermal resistance at the same time. The liquid crystal display device or light-controlling device that uses the liquid crystal composition satisfies excellent characteristics required for practical use.

The invention claimed is:
1. A liquid crystal composition, comprising:
   at least one compound selected from the group consisting of the compounds represented by general formulae (C1) to (C3);
   a first dichroic dye of an azo compound A having a maximum absorption wavelength of 390 nm to 440 nm, the azo compound A represented by general formula (A);
   a second dichroic dye of an azo compound B having a maximum absorption wavelength of 490 nm to 540 nm, the azo compound B represented by the general formula (A); and
   a third dichroic dye of an azo compound C having a maximum absorption wavelength of 550 to 650 nm, the azo compound A represented by the general formula (A),

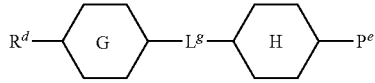

(C1)

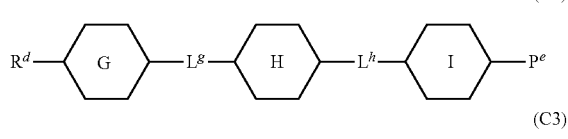

(C2)

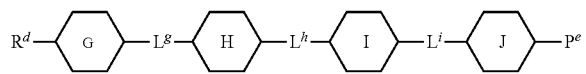

(C3)

wherein in the general formulae (C1) to (C3), $R^d$ and $P^e$ each independently represent an alkyl group having 1 to 12 carbon atoms, in which the alkyl group may be a linear group or may have a methyl or ethyl branch and may have a three- to six-membered ring structure, in which any of —CH₂— present in the alkyl group may be substituted with —O—, —CH=CH—, —CH=CF—, —CF=CH—, —CF=CF—, or and any hydrogen atom present in the group may be substituted with a fluorine atom or a trifluoromethoxy group;

ring G, ring H, ring I and ring J each independently represent a trans-1,4-cyclohexylene group, a trans-decahydronaphthalene-trans-2,6-diyl group, a 1,4-phenylene group that may be substituted with 1 or 2 fluorine atoms or methyl groups, a naphthalene-2,6-diyl group that may be substituted with one or more fluorine atoms, a tetrahydronaphthalene-2,6-diyl group that may be substituted with 1 or 2 fluorine atoms, a 1,4-cyclohexenylene group that may be substituted with 1 or 2 fluorine atoms, a 1,3-dioxane-trans-2,5-diyl group, a pyrimidine-2,5-diyl group, or a pyridine-2,5-diyl group; and $L^g$, $L^h$, and $L^i$ each independently represent a single bond, an ethylene group (—CH₂CH₂—), a 1,2-propylene group (—CH(CH₃)CH₂— and —CH₂CH(CH₃)—), a 1,4-butylene group, —COO—, —OCO—, —OCF₂—, —CF₂O—, —CH=CH—, —CH=CF—, —CF=CH—, —CF=CF—, or —CH=NN=CH—;

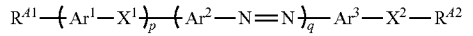

(A)

wherein in the general formula (A), $R^{A1}$ and $R^{A2}$ each independently represent a hydrogen atom, a halogen atom, an alkyl group having 1 to 12 carbon atoms, or a dialkylamino group in which alkyl groups having 1 to 12 carbon atoms are bonded, where one —$CH_2$— or two or more non-adjacent —$CH_2$— in the alkyl group and the dialkylamino group may be each independently substituted with —O—, —CO—, —COO—, or —OCO— and hydrogen atoms in the alkyl group and the dialkylamino group may be substituted with fluorine atoms;

$X^1$ and $X^2$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, or —CF=CF; and $Ar^1$ and $Ar^3$ each independently represent a group selected from groups consisting of formulae shown in List A-x below, where these groups may be each independently substituted with an alkyl group having 1 to 3 carbon atoms, an alkenyl group having 2 or 3 carbon atoms, an alkoxy group having 1 to 3 carbon atoms, an alkenyloxy group having 1 to 3 carbon atoms, a cyano group, or a fluorine atom,

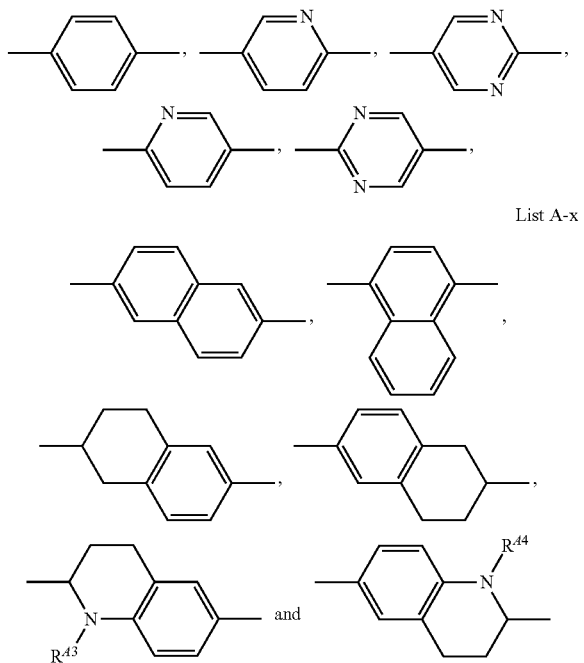

List A-x wherein $R^{A3}$ and $R^{A4}$ each independently represent an alkyl group having 1 to 12 carbon atoms;

$Ar^2$ represents a group selected from groups consisting of formulae shown in List A-y below, where these groups may be each independently substituted with an alkyl group having 1 to 3 carbon atoms, an alkenyl group having 2 or 3 carbon atoms, an alkoxy group having 1 to 3 carbon atoms, an alkenyloxy group having 1 to 3 carbon atoms, a cyano group, or a fluorine atom;

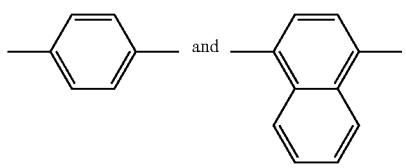

List A-y p represents 0, 1, or 2, where when p represents 2 and a plurality of $Ar^1$ and a plurality of $X^1$ are present, the plurality of $Ar^1$ may be the same or may be independently different from each other and the plurality of $X^1$ may be the same or may be independently different from each other; and q represents 2 or 3, where $Ar^2$ may be the same or may be independently different from each other, wherein a ratio of a content of the compound A, a content of the compound B, and a content of the compound C relative to a total amount of the dichroic dyes in the liquid crystal composition is A:B:C=10 to 60 wt %:10 to 60 wt %:10 to 60 wt %, wherein chromaticities x, y in the standard illuminant D65 are each adjusted to 0.310 to 0.370, wherein the liquid crystal composition has a nematic phase-isotropic liquid phase transition temperature ($T_{ni}$) of 90° C. or higher.

2. The liquid crystal composition according to any one of claim 1, wherein a total content of the compound A, the compound B and the compound C is 0.5 to 5 parts by weight relative to 100 parts by weight of the liquid crystal composition.

3. The liquid crystal composition according to claim 1, wherein a twist pitch p is 2 μm to 20 μm.

4. The liquid crystal composition according to claim 1, further comprising a compound selected from the group consisting of compounds represented by general formula (N),

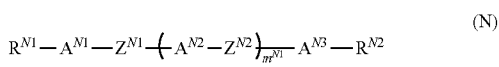

(N)

in the formula, $R^{N1}$ and $R^{N2}$ each independently represent an alkyl group having 1 to 12 carbon atoms, where one —$CH_2$— or two or more non-adjacent —$CH_2$— in the alkyl group may be each independently substituted with —CH=CH—, —O—, —CO—, —COO—, or —OCO—, $m^{N1}$ represents 0, 1, 2, or 3, $A^{N1}$, $A^{N2}$, and $A^{N3}$ each independently represent a group selected from the group consisting of (a) a 1,4-cyclohexylene group (one —$CH_2$— or two or more non-adjacent —$CH_2$— in this group may be substituted with —O—), (b) a 1,4-phenylene group (one —CH= or two or more non-adjacent —CH= in this group may be substituted with —N=), and (c) 1,4-cyclohexenylene, 1,4-bicyclo(2.2.2)octylene, piperidine-1,4-diyl, naphthalene-2,6-diyl, decahydronaphthalene-2,6-diyl, and 1,2,3,4-tetrahydronaphthalene-2,6-diyl, where the group (a), the group (b), and the groups (c) may be each independently substituted with an alkyl group having 1 to 3 carbon atoms, an alkenyl group having 2 or 3 carbon atoms, alkoxyl having 1 to 3 carbon atoms, an alkenyloxy group having 1 to 3 carbon atoms, a cyano group, or a fluorine atom, and at least one of $A^{N1}$, $A^{N2}$, and $A^{N3}$ represents a 2,3-difluoro-1,4-phenylene group, a 1,7,8-trifluoronaphthalene-2,6-diyl group, or a 3,4,5-trifluoronaphthalene-2,6-diyl group, $Z^{N1}$ and $Z^{N2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, or —CF=CF—, and when $m^{N1}$ represents 2 or 3 and a plurality of $A^{N2}$ and a plurality of $Z^{N2}$ are present, $A^{N2}$ may be the same or may be independently different from each other and $Z^{N2}$ may be the same or may be independently different from each other.

5. The liquid crystal composition according to claim 4, comprising compounds represented by general formula (N-i) as the compounds represented by the general formula (N),

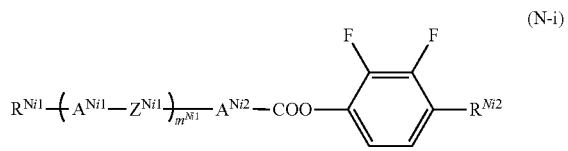

(N-i)

in the formula, $R^{Ni1}$ and $R^{Ni2}$ each independently represent an alkyl group having 1 to 8 carbon atoms, where one —CH$_2$— or two or more non-adjacent —CH$_2$— in the alkyl group may be each independently substituted with —CH=CH—, —O—, —CO—, —COO—, or OCO—, $A^{Ni1}$ and $A^{Ni2}$ each independently represent a group selected from the group consisting of (a) a trans-1,4-cyclohexylene group (one —CH$_2$— or two or more non-adjacent —CH$_2$— in this group may be substituted with —O— and/or —S—), (b) a 1,4-phenylene group (one —CH= or two or more non-adjacent —CH= present in this group may be substituted with —N=), and (c) 1,4-cyclohexenylene, 1,4-bicyclo(2.2.2)octylene, piperidine-1,4-diyl, naphthalene-2,6-diyl, decahydronaphthalene-2,6-diyl, and 1,2,3,4-tetrahydronaphthalene-2,6-diyl, where hydrogen atoms on the group (a), the group (b), and the groups (c) may be each independently substituted with alkyl groups having 1 to 3 carbon atoms, alkenyl groups having 2 or 3 carbon atoms, alkoxyl having 1 to 3 carbon atoms, alkenyloxy groups having 1 to 3 carbon atoms, CN, or halogens, $Z^{Ni1}$ represents a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, or —CF=CF—, and $m^{Ni1}$ represents 0, 1, or 2, and when $m^{Ni1}$ represents 2 and a plurality of $A^{Ni1}$ and a plurality of $Z^{Ni1}$ are present, $A^{Ni1}$ may be the same or may be independently different from each other and $Z^{Ni1}$ may be the same or may be independently different from each other.

6. The liquid crystal composition according to claim 1, further comprising a compound selected from the group consisting of compounds selected from the group of compounds represented by general formulae (A1) to (A3) and general formulae (B1) to (B3),

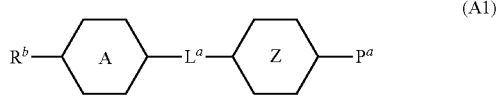

(A1)

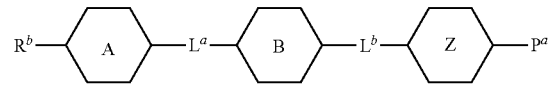

(A2)

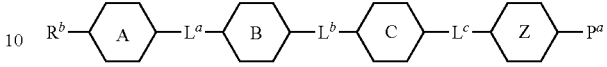

(A3)

in the formulae, $R^b$ represents an alkyl group having 1 to 12 carbon atoms, where the alkyl group may be a linear group or may have a methyl or ethyl branch and may have a three- to six-membered ring structure, any of —CH$_2$— present in the group may be substituted with —O—, —CH=CH—, —CH=CF—, —CF=CH—, —CF=CF—, or and any hydrogen atom present in the group may be substituted with a fluorine atom or a trifluoromethoxy group, and when an asymmetric carbon atom is generated due to branching, the compound may be an optically active compound or a racemate, a ring A, a ring B, and a ring C each independently represent a trans-1,4-cyclohexylene group, a trans-decahydronaphthalene-trans-2,6-diyl group, a 1,4-phenylene group that may be substituted with one or more fluorine atoms, a naphthalene-2,6-diyl group that may be substituted with one or more fluorine atoms, a tetrahydronaphthalene-2,6-diyl group that may be substituted with one or more fluorine atoms, a 1,4-cyclohexenylene group that may be substituted with a fluorine atom, a 1,3-dioxane-trans-2,5-diyl group, a pyrimidine-2,5-diyl group, or a pyridine-2,5-diyl group, $L^a$, $L^b$, and $L^c$ each independently represent a single bond, an ethylene group (—CH$_2$CH$_2$—), a 1,2-propylene group (—CH(CH$_3$)CH$_2$— and —CH$_2$CH(CH$_3$)—), a 1,4-butylene group, —COO—, —OCO—, —OCF$_2$—, —CF$_2$O—, —CH=CH—, —CH=CF—, —CF=CH—, —CF=CF—, or —CH=NN=CH—, a ring Z represents substituents represented by general formulae (La) to (Lc),

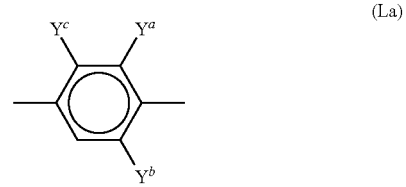

(La)

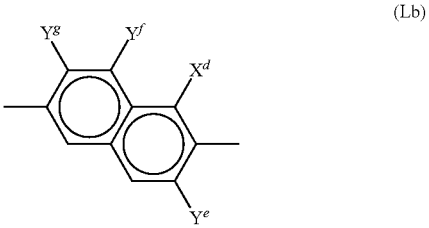

(Lb)

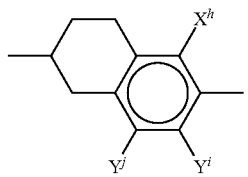 (Lc)

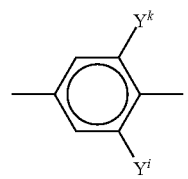 (Ld)

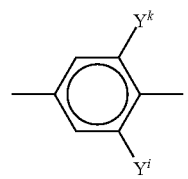 (Le)

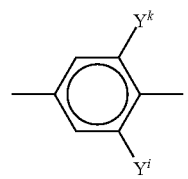 (Lf)

in the formulae, $Y^a$ to $Y^j$ each independently represent a hydrogen atom or a fluorine atom), and $P^a$ represents a fluorine atom, a chlorine atom, a trifluoromethoxy group, a difluoromethoxy group, a trifluoromethyl group, a difluoromethyl group, or an alkoxyl group, alkyl group, alkenyl group, or alkenyloxy group that is substituted with two or more fluorine atoms and has 2 or 3 carbon atoms), and

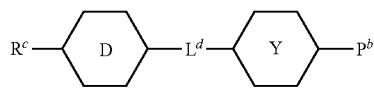 (B1)

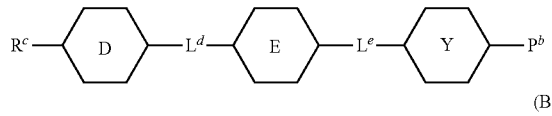 (B2)

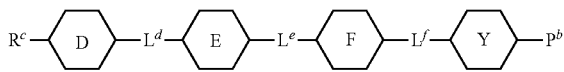 (B3)

in the formulae, RC represents an alkyl group having 1 to 12 carbon atoms, where the alkyl group may be a linear group or may have a methyl or ethyl branch and may have a three- to six-membered ring structure, any of —CH$_2$— present in the group may be substituted with —O—, —CH=CH—, —CH=CF—, —CF=CH—, —CF=CF—, or and any hydrogen atom present in the group may be substituted with a fluorine atom or a trifluoromethoxy group, and when an asymmetric carbon atom is generated due to branching, the compound may be an optically active compound or a racemate, a ring D, a ring E, and a ring F each independently represent a trans-1,4-cyclohexylene group, a trans-decahydronaphthalene-trans-2,6-diyl group, a 1,4-phenylene group that may be substituted with one or more fluorine atoms, a naphthalene-2,6-diyl group that may be substituted with one or more fluorine atoms, a tetrahydronaphthalene-2,6-diyl group that may be substituted with one or more fluorine atoms, a 1,4-cyclohexenylene group that may be substituted with a fluorine atom, a 1,3-dioxane-trans-2,5-diyl group, a pyrimidine-2,5-diyl group, or a pyridine-2,5-diyl group, $L^d$, $L^e$, and $L^f$ each independently represent a single bond, an ethylene group (—CH$_2$CH$_2$—), a 1,2-propylene group (—CH(CH$_3$)CH$_2$— and —CH$_2$CH(CH$_3$)—), a 1,4-butylene group, —COO—, —OCO—, —OCF$_2$—, —CF$_2$O—, —CH=CH—, —CH=CF—, —CF=CH—, —CF=CF—, —OCH$_2$—, —CH$_2$O—, or —CH=NN=CH—, a ring Y is an aromatic ring and represents substituents represented by general formulae ($L^d$) to ($L^f$) below, in the formulae, $Y^k$ to $Y^q$ each independently represent a hydrogen atom or a fluorine atom), and $P^b$ represents a cyano group (—CN), a cyanato group (—OCN), or —C≡CCN.

7. The liquid crystal composition according to claim 1, further comprising a polymerizable compound.

8. The liquid crystal composition according to claim 1, further comprising a stabilizer in an amount of 0.05 to 0.5 wt %.

9. The liquid crystal composition according to claim 1, having a nematic-isotropic transition temperature of 80° C. to 120° C., a dielectric anisotropy of −2.0 to −6.0 or +3.0 to +20.0, and a birefringence of 0.070 to 0.200.

10. A device comprising the liquid crystal composition according to claim 1.

11. The device according to claim 10, wherein a pretilt angle is 80° to 90° or 1° to 150°.

12. The device according to claim 11, wherein a d/p value that indicates a relationship between a twist pitch p and a cell thickness d is 0.5 to 2.2.

13. The device according to claim 10, wherein antiglare treatment is performed on a surface of a substrate.

14. The device according to claim 10, wherein two vertically aligned liquid crystal cells subjected to antiparallel alignment are stacked such that alignment axes of the cells are orthogonal to each other.

15. The device according to claim 10, wherein a film that blocks light having a wavelength of 400 nm or less is stacked on a liquid crystal cell.

16. The device according to claim 10, wherein the device is a light-controlling device.

17. The device according to claim 10, wherein the device is a liquid crystal display device.

18. The liquid crystal composition according to claim 1, wherein the liquid crystal composition has the nematic phase-isotropic liquid phase transition temperature ($T_{ni}$) of 90° C. to 115° C.

19. The liquid crystal composition according to claim 1, wherein at least one of $L^g$, $L^h$, and $L^i$ is COO— or —OCO—.

20. The liquid crystal composition according to claim 1, wherein said at least one compound is represented by the general formula (C2),
   wherein the liquid crystal composition has a negative dielectric anisotropy (Δε).

21. The liquid crystal composition according to claim 1, wherein the azo compound A is 4-[4-{4-(4-ethylbenzyloxy)phenylazo}-2-methylphenylazo]-4'-ethoxycarbonylbiphenyl, or
   wherein azo compound B is 4-N,N-diethylamino-4'-[4-(3,5,5-trimethylhexyloxy)phenylazo}phenylazo] azobenzene, or
   wherein the azo compound C is 4-[4{4-(1-heptyl-2,2,4,7-tetramethyl-1,2,3,4-tetrahydroquinolin-6-ylazo)napthalen-1-ylazo}napthalen-1-ylazo]benzoic acid 4-pentylphenyl ester.

* * * * *